United States Patent [19]
Eum et al.

[11] Patent Number: 5,610,890
[45] Date of Patent: Mar. 11, 1997

[54] CARTRIDGE INSERTING/EXTRACTING APPARATUS FOR A MAGNETOOPTICAL DISK PLAYER

[75] Inventors: Jae-Yong Eum, Suwon; Seung-Min Kim, Seoul, both of Rep. of Korea

[73] Assignee: Samsug Electronics Co., Ltd., Kyungki-Do, Rep. of Korea

[21] Appl. No.: 354,717

[22] Filed: Dec. 6, 1994

[30] Foreign Application Priority Data

Dec. 6, 1993 [KR] Rep. of Korea ........................ 93-26600
Dec. 6, 1993 [KR] Rep. of Korea ........................ 93-26601

[51] Int. Cl.⁶ ............................ G11B 17/04; G11B 33/02
[52] U.S. Cl. ........................................ 369/77.2; 360/99.06
[58] Field of Search ........................ 369/77.2, 75.1, 369/75.2; 360/99.06, 96.6

[56] References Cited

U.S. PATENT DOCUMENTS 4,887,174  12/1989  Tezuka .................. 360/99.06
5,355,357  10/1994  Yamamori et al. ...... 369/75.2
5,452,280   9/1995  Yamamori et al. ...... 369/77.2

*Primary Examiner*—Robert S. Tupper
*Assistant Examiner*—David D. Davis
*Attorney, Agent, or Firm*—Sughrue, Mion, Zinn, Macpeak & Seas

[57] ABSTRACT

A cartridge inserting/extracting apparatus for use in a magnetooptical disk player for recording and/or reproducing information of a magnetooptical disk using an optical pickup and magnetic head uses a cartridge holder rotationally opened and/or closed on a deck for loading a minidisk, and includes an extracting member for extracting the minidisk received in the cartridge holder, a locking release member, and a locking lever member. The apparatus prevents a disk from being removed in a state where the magnetic head will be damaged.

4 Claims, 25 Drawing Sheets

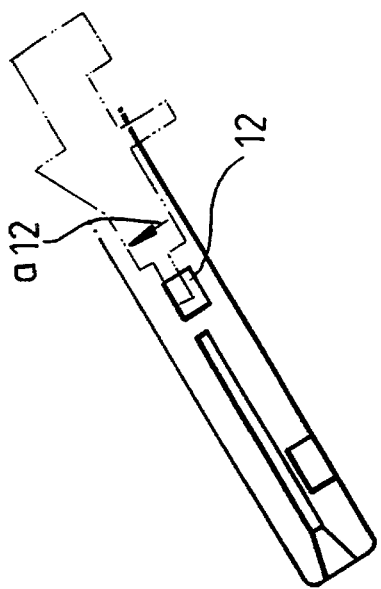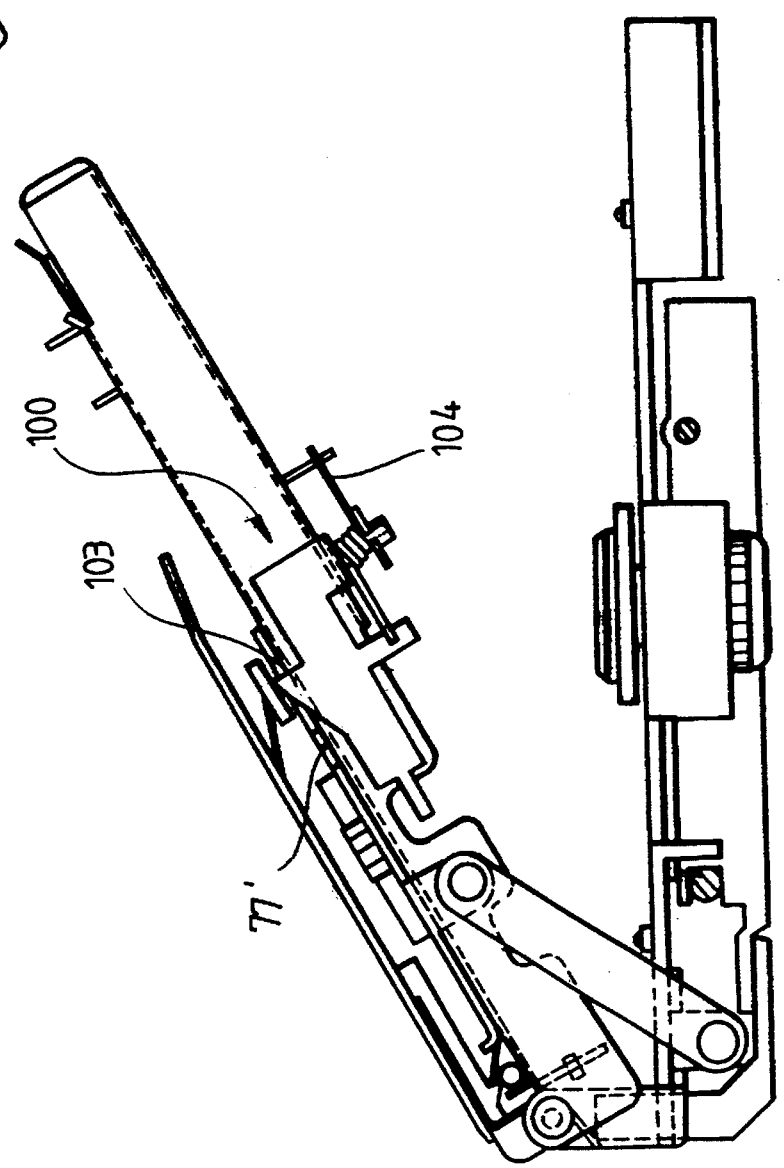
FIG.18

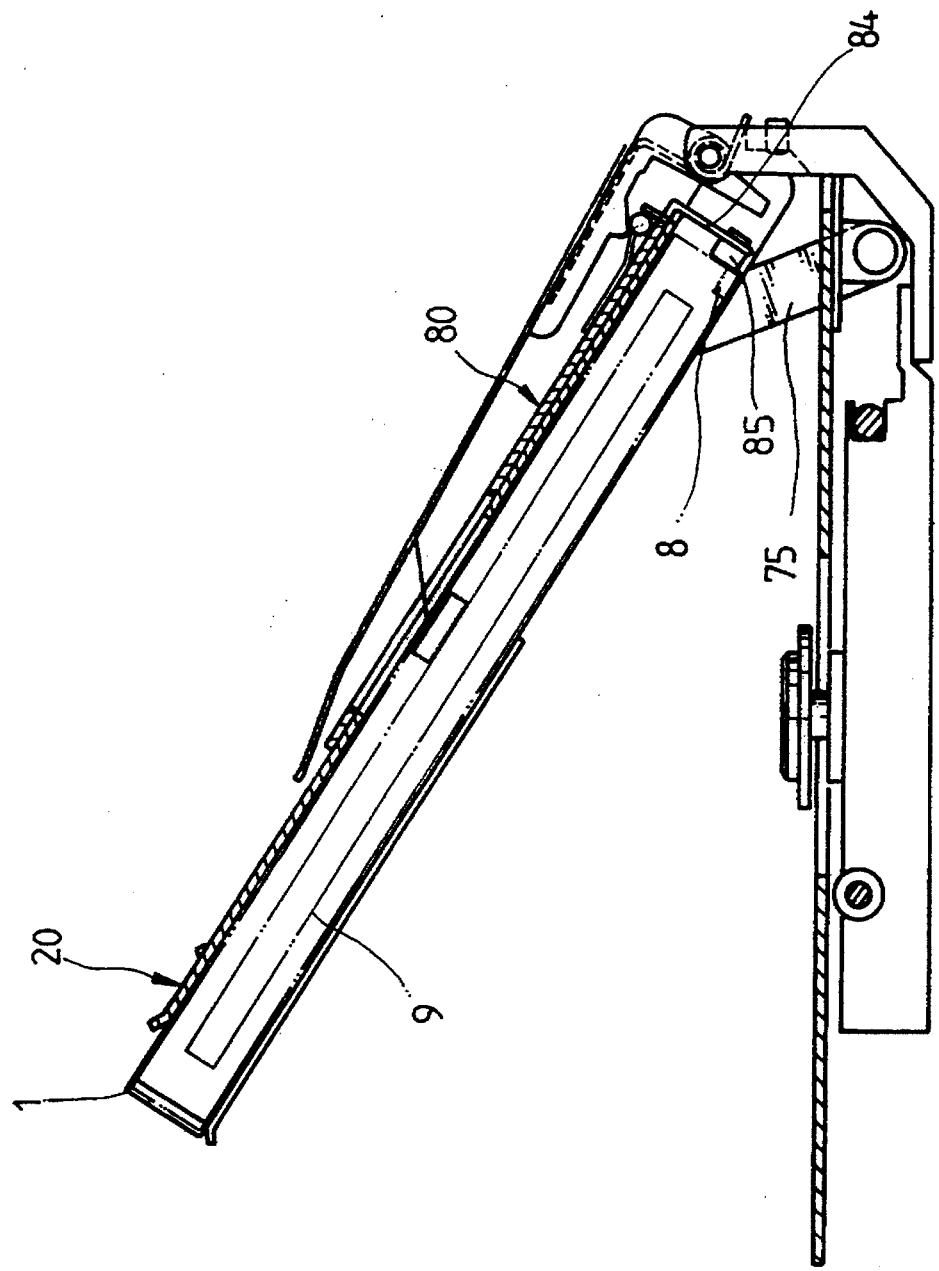

CARTRIDGE INSERTING/EXTRACTING APPARATUS FOR A MAGNETOOPTICAL DISK PLAYER

BACKGROUND OF THE INVENTION

1. Field of the Invention

The present invention relates to a magnetooptical recording and/or reproducing apparatus for recording information on a recording medium and reproducing the recorded information by projecting a focused optical beam on the medium and simultaneously applying a magnetic field. More particularly, this invention relates to a cartridge inserting/extracting apparatus for a portable magnetooptical disk player using a magnetooptical disk cartridge in which a magnetooptical disk is rotatably received.

2. Description of the Related Art

As is known well, a magnetooptical disk has recording layers in which desired information is recorded, and the recorded information is reproduced using a magnetooptical disk player which has an optical pickup for projecting a focused optical beam and a bias magnet for applying a magnetic field. These recording layers are composed of a magnetic material, for example, terbium-ferrum (TbFe) or terbium-ferrum-cobalt (TbFeCo). Such a magnetooptical disk is usually housed in a disk cartridge to be loaded on a disk drive together via a caddy. Recently, a magnetooptical disk cartridge called a "minidisk", into which a magnetooptical disk having a diameter of 64 mm is installed, was placed on the market by the Sony Corporation of Japan. Developments of the player for the minidisk have since progressed actively. There are two types of minidisks currently on the market: one is a recordable type shown in FIGS. 1A and 1B and the other is a reproduction-only type shown in FIGS. 2A and 2B.

Referring to FIGS. 1A and 1B, the recordable minidisk 1 has a cartridge cell 2 having two openings 3 and 4 formed on respective sides thereof, and a shutter 5 movably operated along a sliding groove 6 for opening and closing the openings 3 and 4 simultaneously. Both sides of the disk 9 in the cartridge cell 2 are exposed through the openings 3 and 4. The reproduction-only type of minidisk 1' has a cartridge cell 2' having an opening 3' on only one side thereof and a shutter 5' which moves along a sliding groove 6' for opening and closing the opening 3'. Thus, only one side of a disk 9' is exposed through the opening 3'.

Arrows 7 and 7' marked on the upper surface of the cartridge cells 2 and 2' of minidisks 1 and 1' show the direction for insertion into a player. Also, recording and reproducing detection grooves 8 and 8' each having a different size are formed on the bottom surface of each cartridge cells 2 and 2', for allowing detection of whether an inserted minidisk is a recordable type or a reproduction-only type. Two loading grooves 10 and 10' are provided on the left and right of the bottom of the disk cartridge cells 2 and 2' and a plurality of cartridge loading grooves 11 and 11' for facilitating loading of a disk cartridge into a deck are formed on the bottom of the cartridge cells 2 and 2'. Two fixing grooves 12 and 12' are provided on the sides of the disk cartridge (see FIGS. 1A and 2A).

A portable player (Sony model MZ-1) is available as a recording and reproducing apparatus for the minidisks. This player has a slot into which the minidisks can be inserted in a "slot-in" method, and includes a spindle motor for rotating the inserted minidisk, an optical pickup for projecting a focused optical beam onto one side of the disk, and a magnetic head for applying a magnetic field to the other side of the disk. The cartridge of the minidisk inserted into the slot is loaded into a deck, in the state in which the shutter is pushed aside and thereby the opening is opened, and at the same time the disk in the cartridge is loaded onto a rotating turntable by the spindle motor. If a reproducing mode is selected with respect to the rotating disk, then only the optical pickup operates in the state where the magnetic head is raised. If a recording mode is selected, then the magnetic head is lowered by a motor and thereby substantially contacts the other side of the disk and moves together with the optical pickup. Even when the recording mode is selected, if a reproduction-only minidisk is loaded, the magnetic head is not lowered.

Generally, it is desirable that a portable player be lightweight and compact and consume very little electrical power in order to operate as long as possible. However, since the inserting mechanism of the minidisk in the "slot-in" method and the mechanism for raising and lowering the magnetic head using a motor are complicated and require a large amount of space, it is difficult to make the player small and lightweight as a whole. Also, power consumption is excessive since the minidisk is inserted and/or extracted and the magnetic head is raised and/or lowered by separate electric driving means.

An attempt at solving these problems is disclosed in Korean Patent Application No. 93-9798. As shown in FIGS. 3 and 4, if the recordable type minidisk 1 is inserted into a cartridge holder 20, then a locking protrusion 55 of an extracting member 50 is hung on a locking pin 61 and a locking portion 95 of a slide locking member 90 is hung on a locking pin 94. Since the recordable type disk cartridge 1 pushes a protruding pin 85 and thereby a slide member 30 retreats and simultaneously a supporting stick 86 supporting a protrusion portion 45 of a head supporting member 32 retreats and the head supporting member 32 is lowered, a magnetic head 30 contacts the top of a disk 9. However the lowered magnetic head 30 may become damaged if a user pulls out the minidisk 1 to exchange it with another while the cartridge holder 20, in which the minidisk 1, is received is still open.

SUMMARY OF THE INVENTION

It is an object of the present invention to provide a cartridge inserting/extracting apparatus for a magnetooptical disk player which is lightweight and compact and consumes little electrical power, so as to be suitable for portable use. Another object of the present invention is to provide a cartridge inserting/extracting apparatus for a magnetooptical disk player in which a magnetooptical minidisk is mechanically loaded and unloaded on a main body and a magnetic head is well protected.

According to the present invention, there is provided a cartridge inserting/extracting apparatus for a magnetooptical disk player which comprises a cartridge holder into which a magnetooptical disk cartridge disk is received. The cartridge holder is rotationally operated to load the magnetooptical disk cartridge on a deck of the magnetooptical disk player. A magnetic head is lowered to contact the inserted magnetooptical disk, and extracting means installed on an upper surface of the cartridge holder is moved while being pushed by the inserted magnetooptical disk cartridge, for extracting the inserted magnetooptical disk cartridge. The cartridge inserting/extracting apparatus further comprises:

first locking release means installed on the upper surface of the cartridge holder and interlocking in accordance with the rotational operation of the cartridge holder on the upper surface of the cartridge holder; and first extraction preventing means installed at the position corresponding to the side of the cartridge holder in which the first locking release means is installed, for locking the completely inserted magnetooptical disk cartridge in order to prevent the inserted cartridge from moving in an extraction direction wherein the locking state can be released only by movement in a locking release direction of the first locking release means.

BRIEF DESCRIPTION OF THE DRAWINGS

The above objects and advantages of the present invention will become more apparent by describing in detail a preferred embodiment thereof with reference to the attached drawings in which:

FIG. 18 is a side view of the main portion of the cartridge holder of the inserting/extracting apparatus for the magnetooptical disk player, according to the second preferred embodiment of the present invention;

FIG. 26 is a sectional view cut along line C—C of FIG. 23, showing a recordable minidisk inserted into the cartridge holder of the inserting/extracting apparatus for the magnetooptical disk player, according to the third preferred embodiment.

DETAILED DESCRIPTION OF THE PREFERRED EMBODIMENTS

Figure 1A:
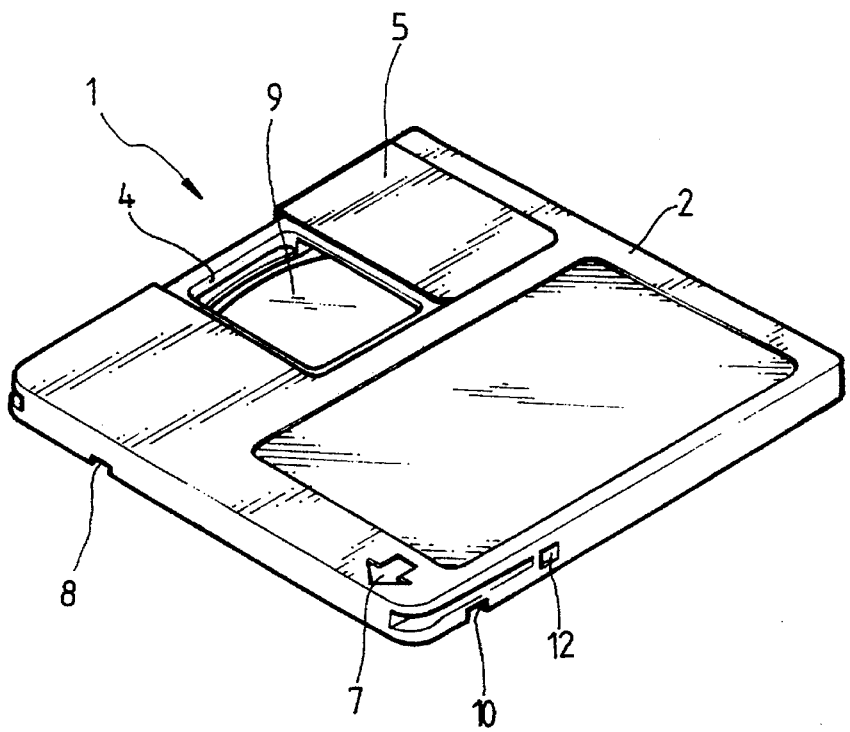
FIGS. 1A and 1B are perspective views of a recordable magnetooptical disk cartridge, viewed from above and below, respectively.
Figure 1B:
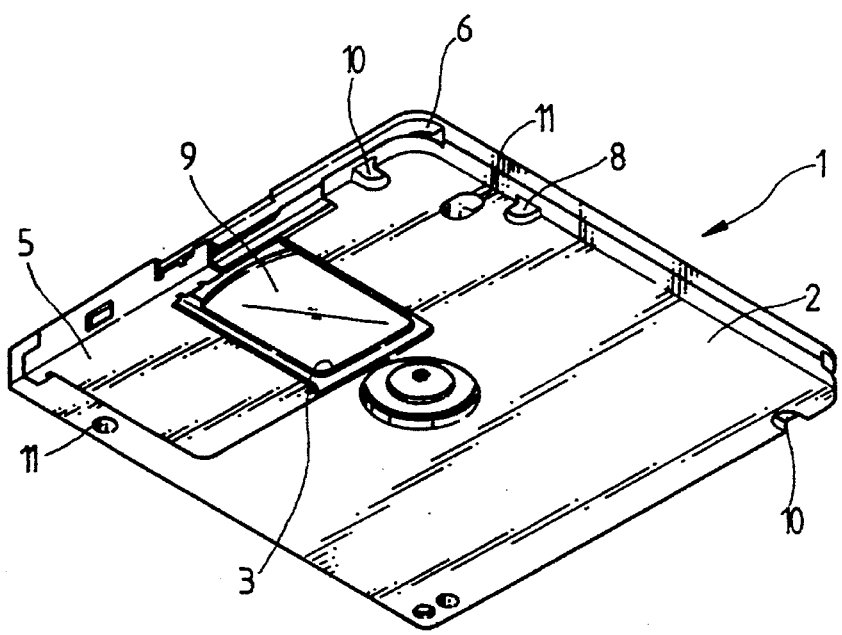
Figure 2A:
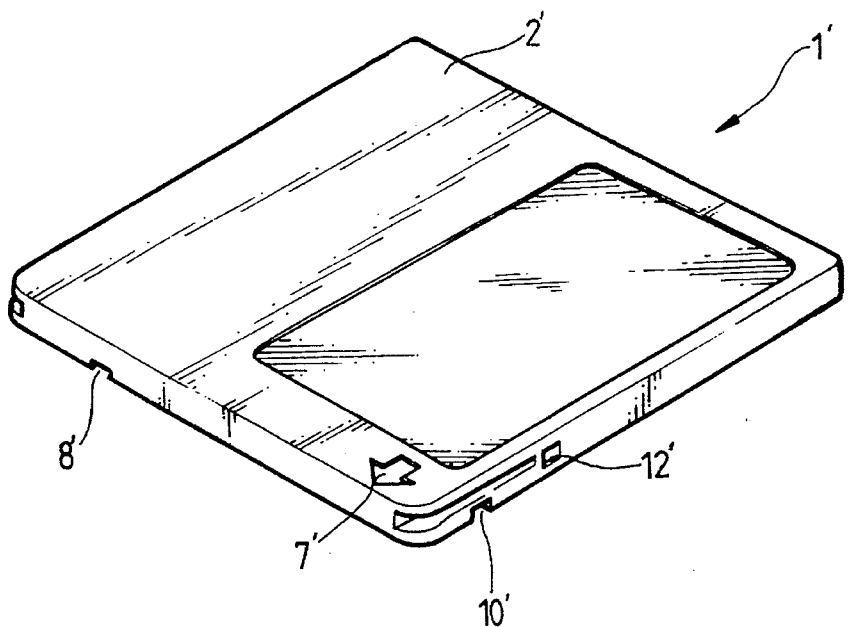
FIGS. 2A and 2B are perspective views of a reproduction-only magnetooptical disk cartridge, viewed from above and below, respectively.
Figure 2B:
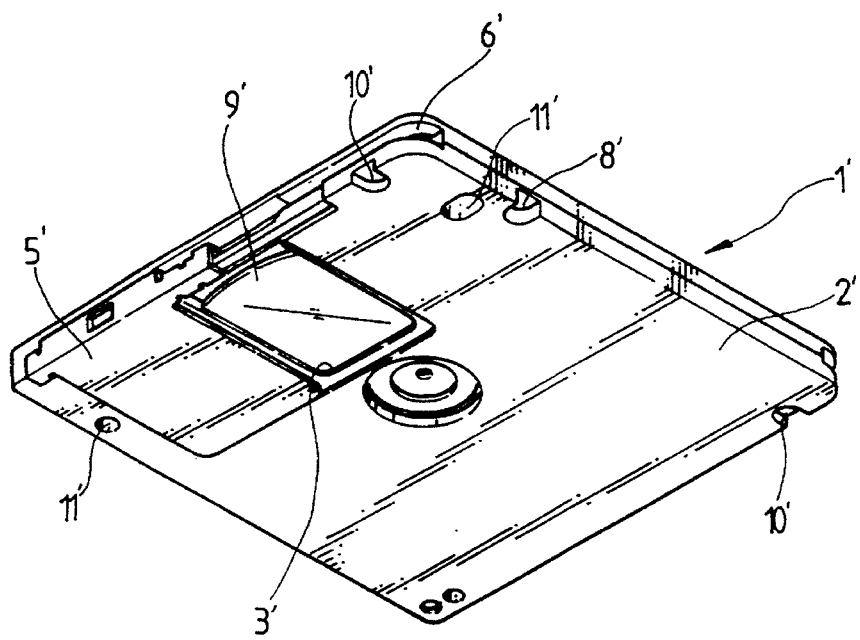
Figure 3:
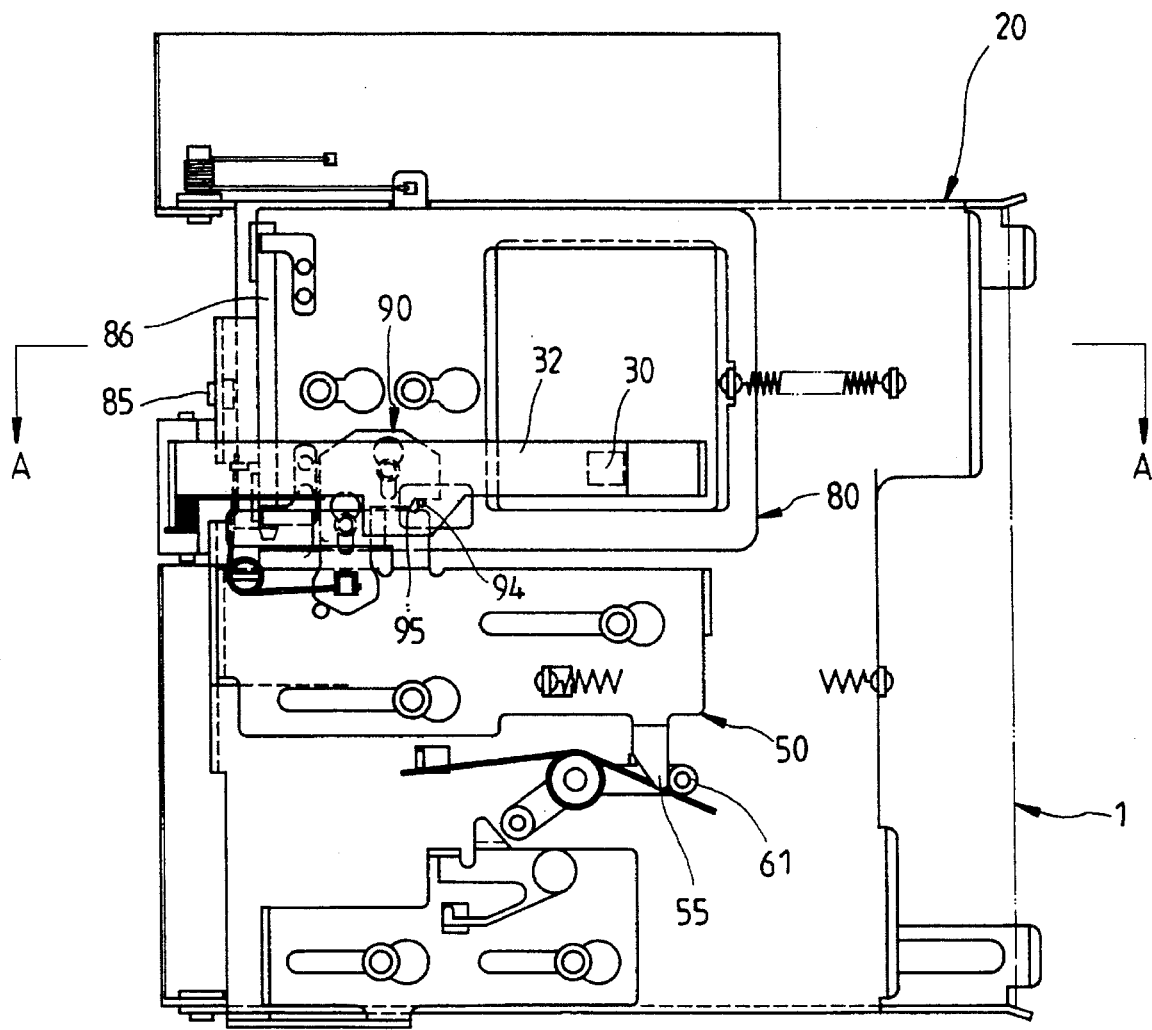
FIG. 3 is a plan view showing a recordable minidisk inserted into an opened cartridge holder of a conventional magnetooptical disk player.
Figure 4:
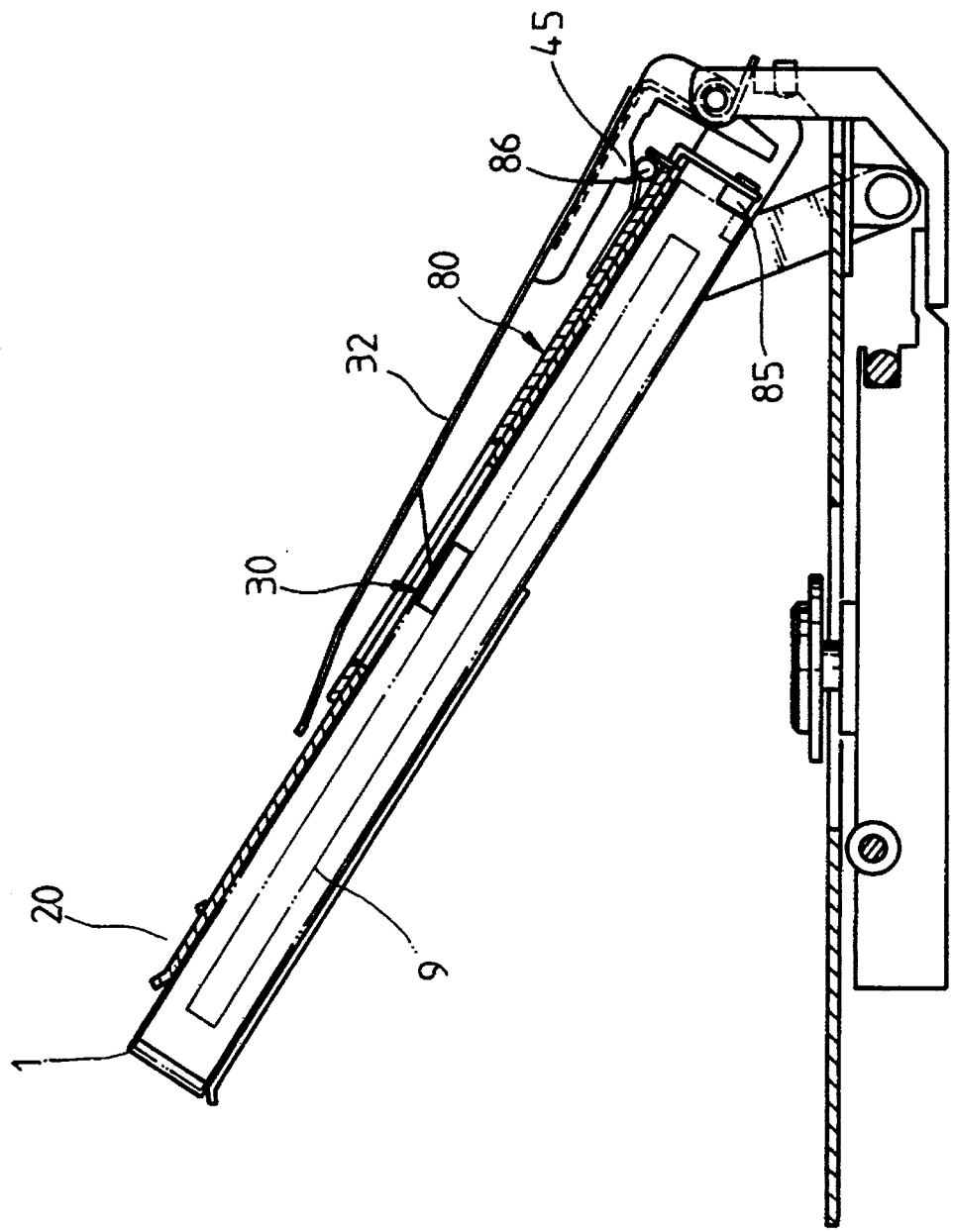
FIG. 4 is a sectional view cut along line A—A of FIG. 3.
Figure 5:
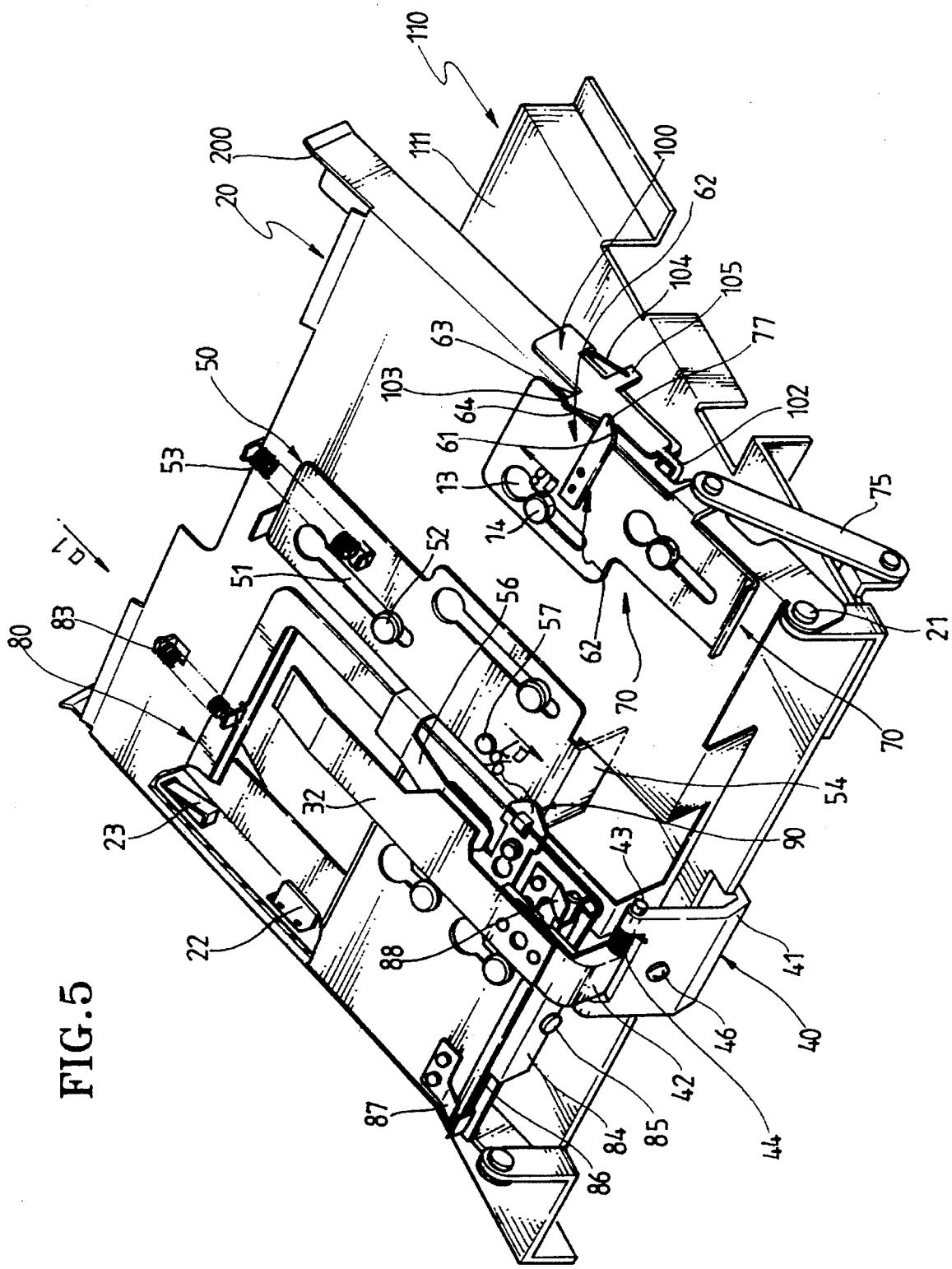
FIG. 5 is a perspective view of a cartridge inserting/extracting apparatus for a magnetooptical disk according to the preferred embodiments, showing the cartridge holder opened.
Figure 6:
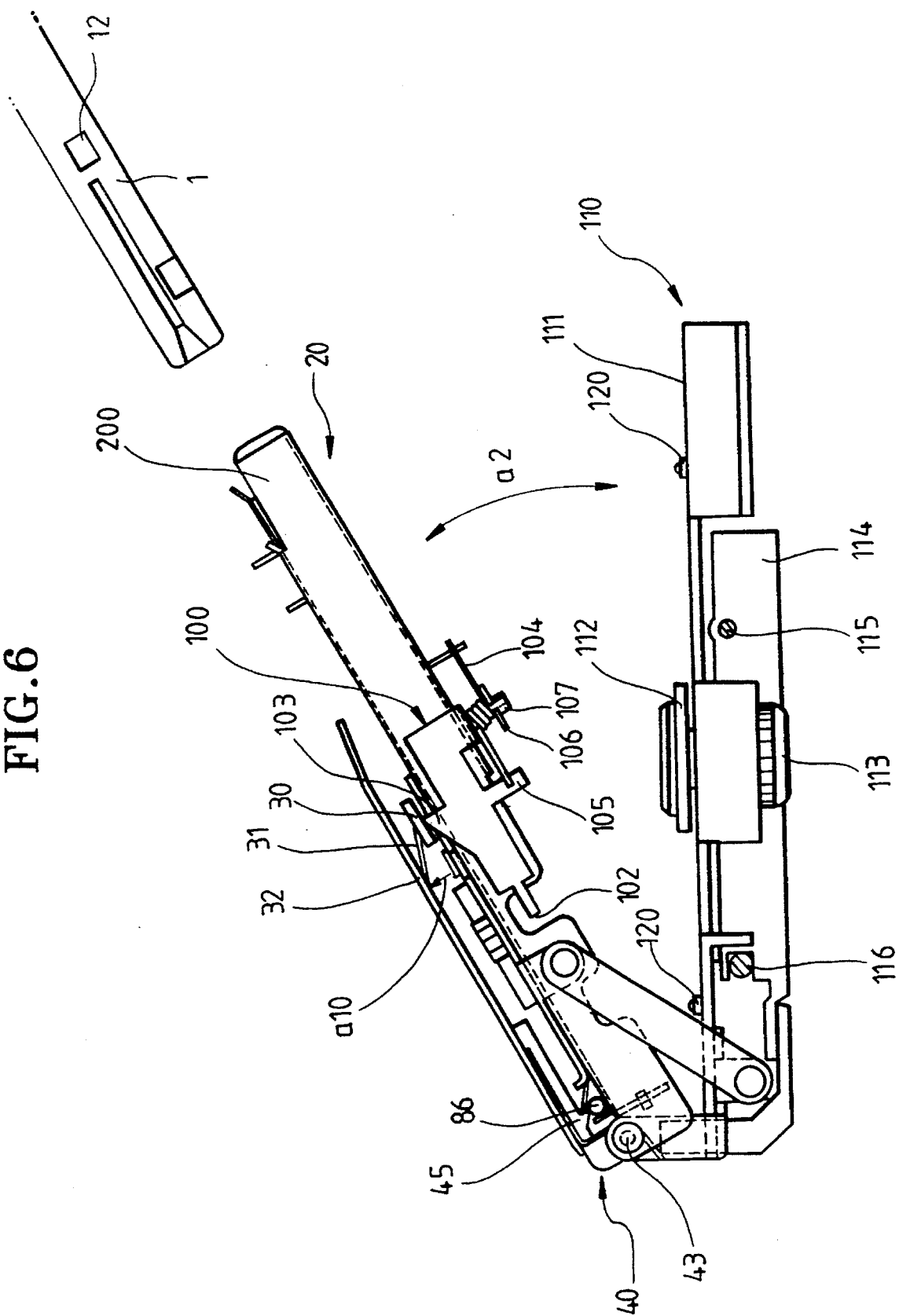
FIG. 6 is a side view of the cartridge inserting/extracting apparatus for the magnetooptical disk player according to the preferred embodiments.

Hereafter, with reference to the attached drawings, a detailed description of the preferred embodiments of the present invention shall be given. FIGS. 5 and 6 illustrate a first preferred embodiment. A deck 110 has an upper surface 111 onto which minidisk 1 (FIGS. 1A and 1B) or minidisk 1' (FIGS. 2A and 2B) is loaded. A minidisk loading pin 120 for guiding a minidisk to be loaded is provided on the upper surface 111 for accurate loading. The minidisk loading pin 120 is inserted into a cartridge loading groove 11 and 11' (FIGS. 1A, 1B, 2A and 2B) of the minidisk to perform its function. A cartridge holder 20 receives the minidisk 1 or minidisk 1' which is inserted in the direction indicated by arrow a1, and is connected to the deck 110 by a hinge 21 and thus can be rotated in the direction indicated by arrow a2 toward the upper surface of the deck 110.

Figure 7:
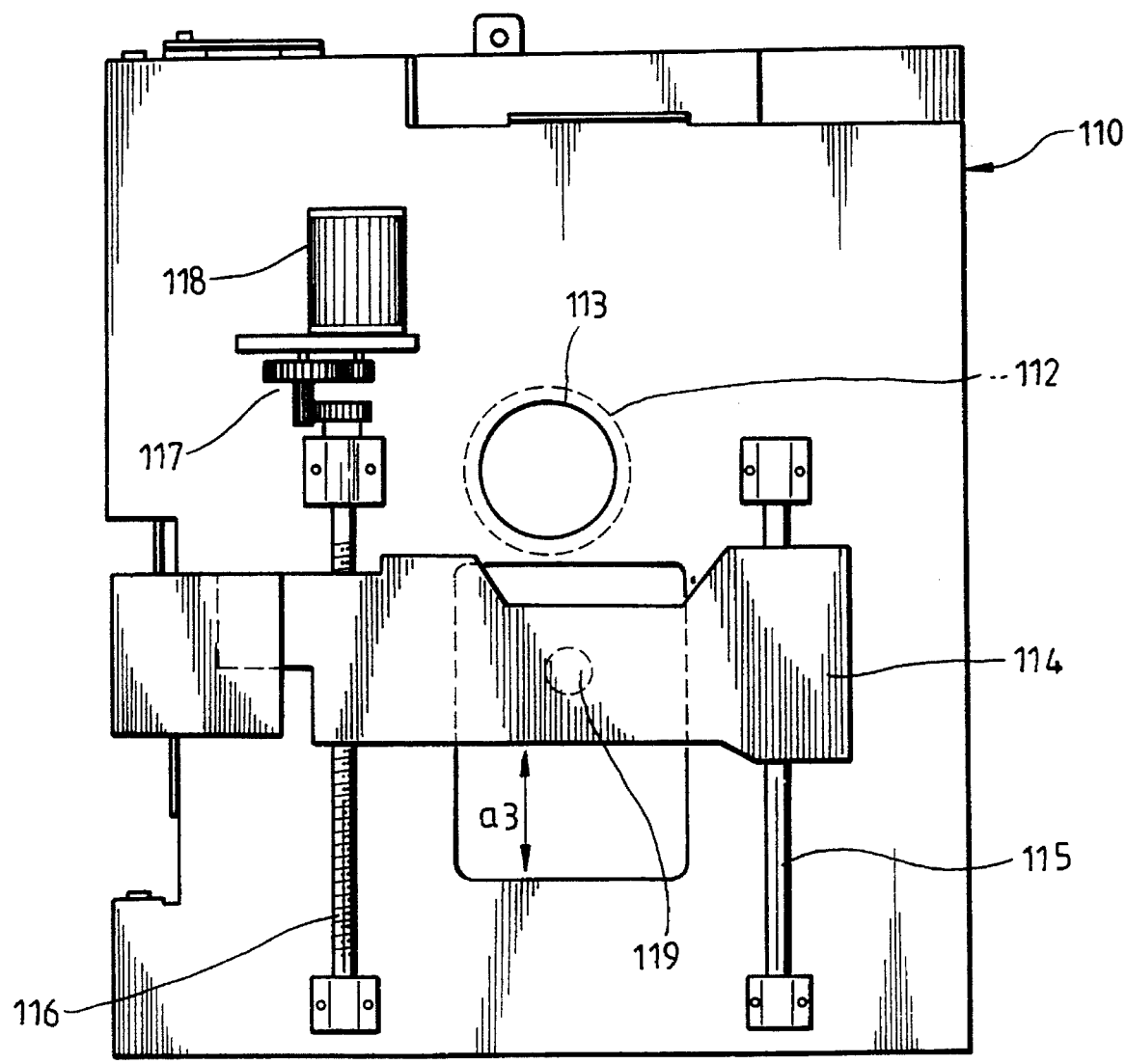
FIG. 7 is a bottom view of the cartridge inserting/extracting apparatus for the magnetooptical disk player according to the preferred embodiments.

On one side of the cartridge holder 20, a shutter opener 22 for opening a shutter 5 (refer to FIGS. 1A and 1B) or a shutter 5' (refer to FIG. 2B) when a minidisk is inserted, and a shutter closer 23 for closing the shutters 5 and 5' when the minidisk is extracted, are provided. A magnetic head 30 is provided on the upper surface of the cartridge holder 20. The magnetic head 30 is attached to the end of a flexible plate spring 31 which is supported by head supporting member 32. As shown in FIGS. 6 and 7, a turntable 112, onto which a magnetooptical disk of the minidisk is loaded, is installed on the upper surface 111, and a cartridge guiding pin 120 for loading the minidisk 1 is installed thereon. The turntable 112 is directly connected to a spindle motor 113 provided under the deck 110. An optical pickup assembly 114 is supported by a guide rod 115 and a screw shaft 116 which extends in parallel with the guide rod 115, and thus can move in the direction indicated by arrow 23 (FIG. 7) by the rotation of the screw shaft 116. The screw shaft 116 is connected to a transporting motor 118 through a gear train 117. The optical pickup assembly 114 has an objective lens 119 and projects the optical beam focused by the objective lens 119 on one side of the magnetooptical disk loaded onto the turntable 112 of the upper surface of the deck 110. The optical pickup assembly 114 receives the optical beam reflected from the magnetooptical disk and thereby detects an electrical signal, such as a reproducing signal, in a known manner.

Figure 8:
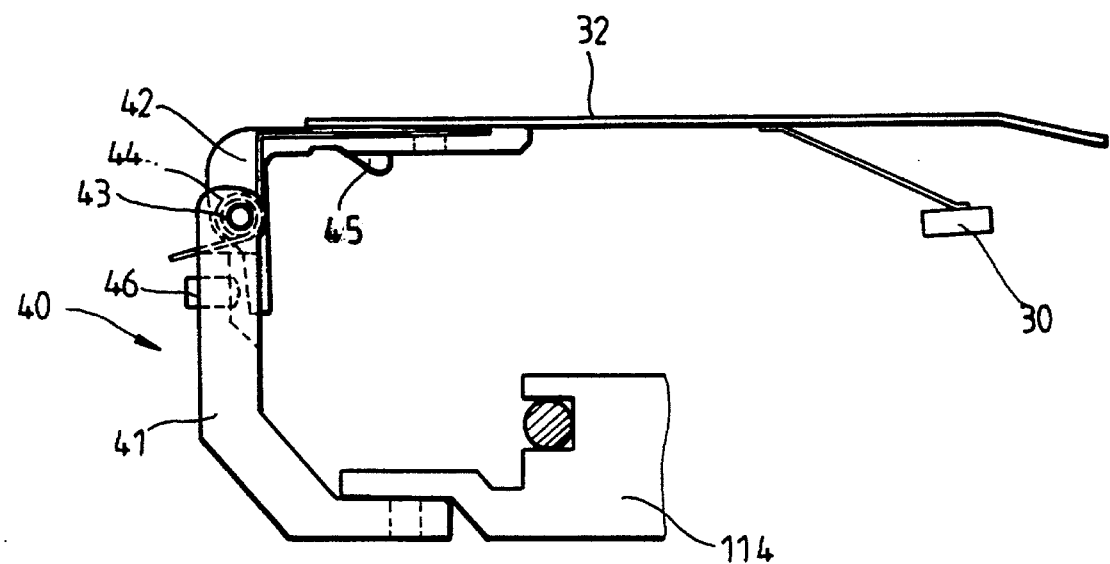
FIG. 8 is an extracted side view showing a connecting portion between an optical pickup assembly and a magnetic head in the cartridge inserting/extracting apparatus for the magnetooptical disk player according to the preferred embodiments.
Figure 9:
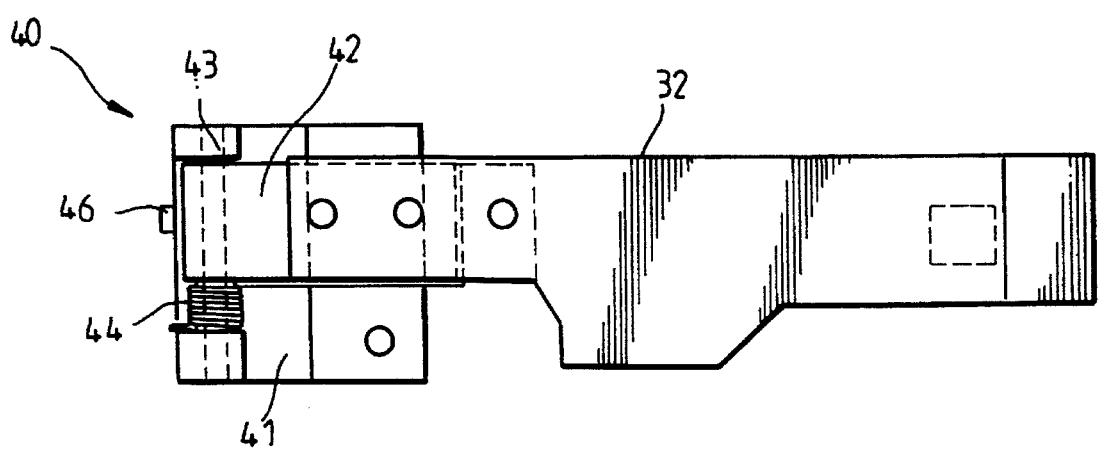
FIG. 9 is an extracted plan view showing the connecting portion between the optical pickup assembly and the magnetic head in the cartridge inserting/extracting apparatus for the magnetooptical disk player according to the preferred embodiments.

Referring to FIGS. 5, 8 and 9, there is a connecting member 40 for connecting the optical pickup assembly 114 and the head supporting member 32. The connecting member 40 includes a pickup connecting portion 41 fixed to the optical pickup assembly 114, a head connecting potion 42 connected to the head supporting member 32, and a hinge portion 43 for connecting the pickup connecting portion 41 and the head connecting portion 42. The hinge portion 43 has a central axis which is in parallel with a hinge 21 which connects the deck 110 and the cartridge holder 20. That is, the optical pickup assembly 114 and magnetic head 30 can be transferred together in the a3 direction (FIG. 7) by the connecting member 40, and the magnetic head 30 can be rotated together with the head supporting member 32 and the head connecting portion 42 in the a2 direction (FIG. 6) which is the same as the opening/closing direction of the cartridge holder 20. Also, the head supporting member 32 is elastically biased downwards by a coil spring 44 which is wrapped around the hinge portion 43.

A protrusion portion 45 extending downward is formed on the head connecting portion 42 and engaged with a magnetic head raising/lowering means (described below). Also, an adjusting screw 46 is installed so as to pass through the pickup connecting portion 41, with its leading end in contact with the rear end portion of the head connecting portion 42. Thus, the adjusting screw 46 controls the horizontal state of the head supporting member 32.

Figure 10:
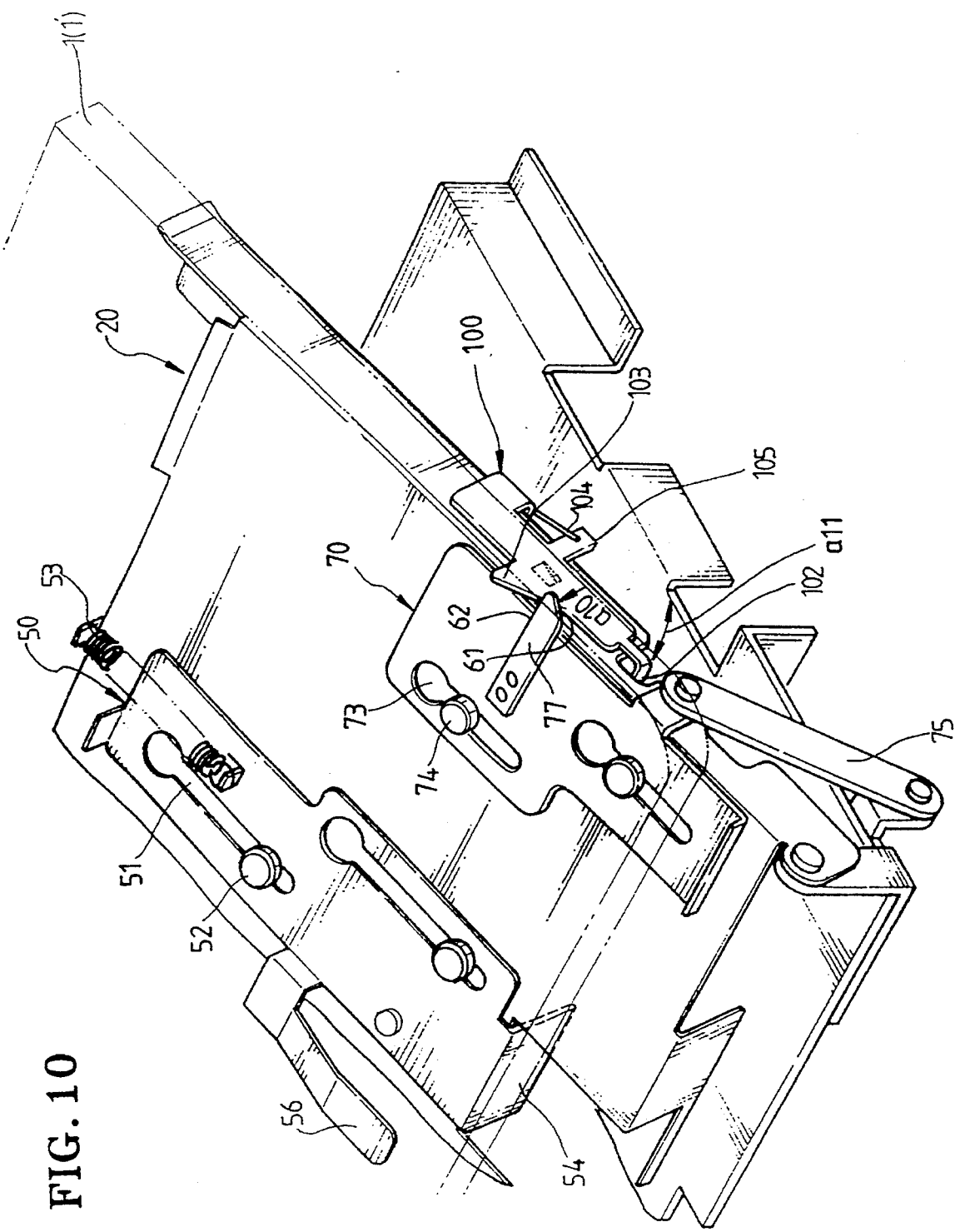
FIG. 10 is an extracted perspective view showing a cartridge extractor and a locking lever member in the cartridge inserting/extracting apparatus for the magnetooptical disk player according to the preferred embodiments.

Referring to FIGS. 5 and 10, extracting member 50 of the extracting means for pushing out (forward) the minidisk 1 which is received therein and a locking release member 70 are provided on the upper surface of the cartridge holder 20. A locking lever member 100 is installed adjacent to locking release member 70 for preventing extraction of the minidisk 1 by the user. The extracting member 50 is supported by a slot 51 and supporting pin 52 so as to move back and forth and is elastically biased forward, i.e., in an extracting direction, by a spring 53. The extracting member 50 has a contacting portion 54 for contacting the front of the inserted minidisk and a head supporting portion 56 for supporting the head supporting member 32. The locking release member 70 is supported by a slot 73 and supporting pin 74 so as to move back and forth, and is connected to the deck 110 by a link 75. A locking release plate spring 77 is provided on the outer surface of the locking release member 70 for engaging with the locking lever member 100 in a manner described below. A sloped surface 61 and a perpendicular surface 62 (with respect to the locking release member 70) are provided at one end of the locking release plate spring 77. The locking release member 70 makes the locking release plate spring 77 move back and forth according to a closing and/or opening of the cartridge holder 20.

The locking lever member 100, as shown in FIGS. 5 and 6, is installed on a left surface 200 of the cartridge holder 20 and elastically biased clockwise by a locking lever spring 104, and comprises a locking lever spring supporting portion 105 for supporting the force of the locking lever spring 104 and a suspending portion 102 for engaging with the fixing grooves 12 or 12' of the minidisk 1 or minidisk 1'. The locking lever member 100 and the locking lever spring 104 are rotatable around a locking lever supporting stick 107 (see FIG. 6) provided on the lower part of the cartridge holder 20, and a washer 106 is coupled through the locking lever supporting stick 107. A locking lever protrusion portion 103 is formed on an upper part of the locking lever member 100 to interlock with the locking release portion 70 and has a sloped surface 64 and a perpendicular surface 63 (see FIG. 5).

Figure 11:
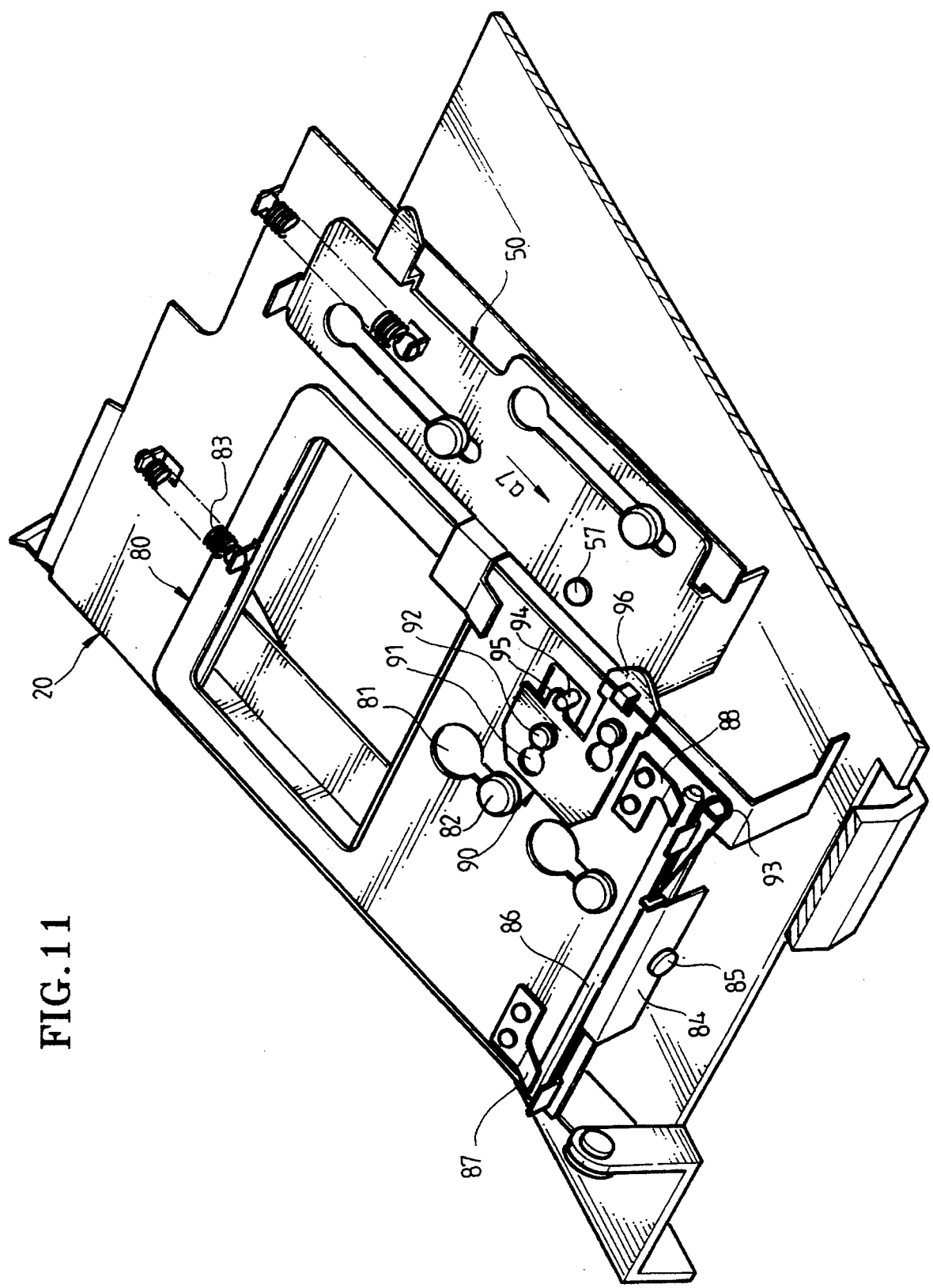
FIG. 11 is an extracted perspective view showing a sliding member and a slide locking member in the cartridge inserting/extracting apparatus for the magnetooptical disk player according to the preferred embodiments.

Referring to FIGS. 5 and 11, a slide member 80 of an raising/lowering means, for detecting whether an inserted minidisk is recordable and for raising/lowering the magnetic head 30 together with a recordable minidisk 1 when a recordable minidisk 1 (FIG. 1) is inserted, is installed on the upper surface 111 of the cartridge holder 20. This slide member 80 is supported by a slot 81 and supporting pin 82 so as to move back and forth, and is elastically biased forward by a spring 83. The slide member 80 has a protruding pin 85 provided on a bent portion 84 at the rear thereof. The protruding pin 85 is disposed to correspond with the detection grooves 8 and 8' formed in the inserted minidisk 1 and 1' of FIGS. 1 and 2. Further, the protruding pin 85 is sized so as not to enter in the detection groove 8 of recordable minidisk 1 but to enter the detection groove 8' of reproduction-only minidisk 1'.

A head supporting stick 86 having a length approximately equal to the radius of a magnetooptical disk is fixedly coupled onto the slide member 80 by two fixing plates 87 and 88. The slide member 80 has a supporting pin 92. Thus, a slide locking member 90 having an elongated hole 91 is supported by the supporting pin 92 so as to move laterally, and is elastically biased in the direction toward an extracting member 50 by a torsion spring 93. The slide locking member 90 has a locking portion 95 capable of being hung on a rear part of a locking pin 94 which is established in the cartridge holder 20, and a locking release portion 96 for making the locking portion 95 retreat in order to release a locking state of the locking portion 95 together with an interlocking pin 57 provided on the extracting member 50.

Figure 15:
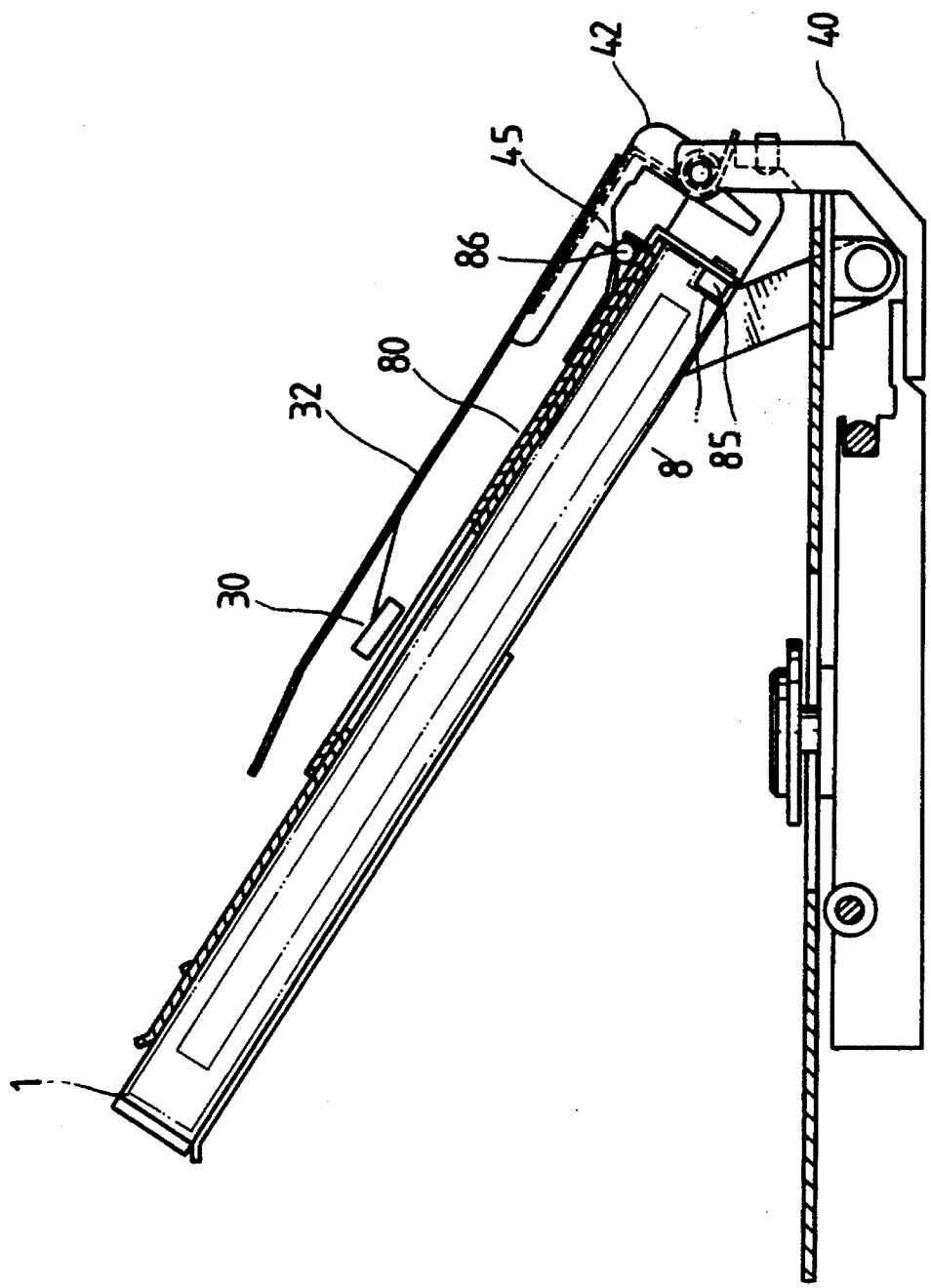
FIG. 15 is a sectional view cut along line B—B of FIG. 13, showing a reproduction-only minidisk inserted into the cartridge holder of the inserting/extracting apparatus for the magnetooptical disk player according to the preferred embodiment.
Figure 16:
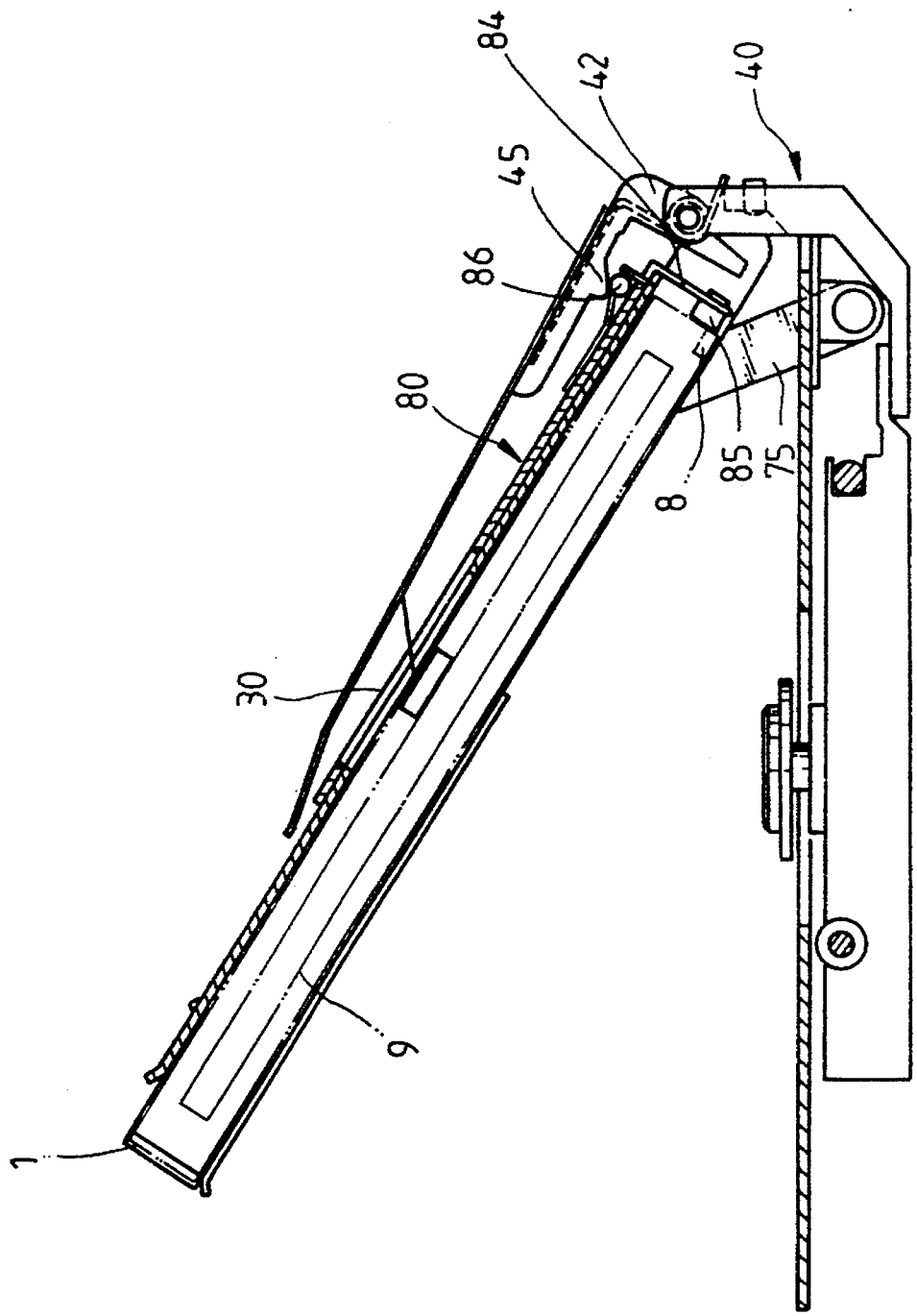
FIG. 16 is a sectional view cut along line B—B of FIG. 13, showing the recordable minidisk inserted into the cartridge holder of the inserting/extracting apparatus for the magnetooptical disk player according to the preferred embodiment.

If a user were to insert the recordable minidisk 1 into the cartridge holder 20 and then extracts the minidisk 1 in order to exchange it with another recordable minidisk without closing the cartridge holder 20, then the magnetic head may be damaged. That is, as shown in FIG. 16, as the recording/reproducing detection groove 8 of the recordable minidisk 1 pushes protruding pin 85, to thereby move the slide member 80 and supporting stick 86 so that the magnetic head 30 contacts the upper surface of the disk, the head 30 may become damaged by forcible extraction under such conditions. However, in the case of reproduction-only minidisk 1' as shown in FIG. 15, the depth of the recording/reproducing detection groove 8' is deeper than that of the recording/reproducing detection groove 8 of the recordable-type disk cartridge 2, the protruding pin 85 of the slide member 80 is inserted into recording/reproducing detection groove 8'. As a result, since this slide member 80 does not move and the supporting stick 86 supports the protrusion portion 45 of the head supporting member 32, the magnetic head 30 does not descend, and thus damage of the magnetic head 30 does not occur.

Figure 12:
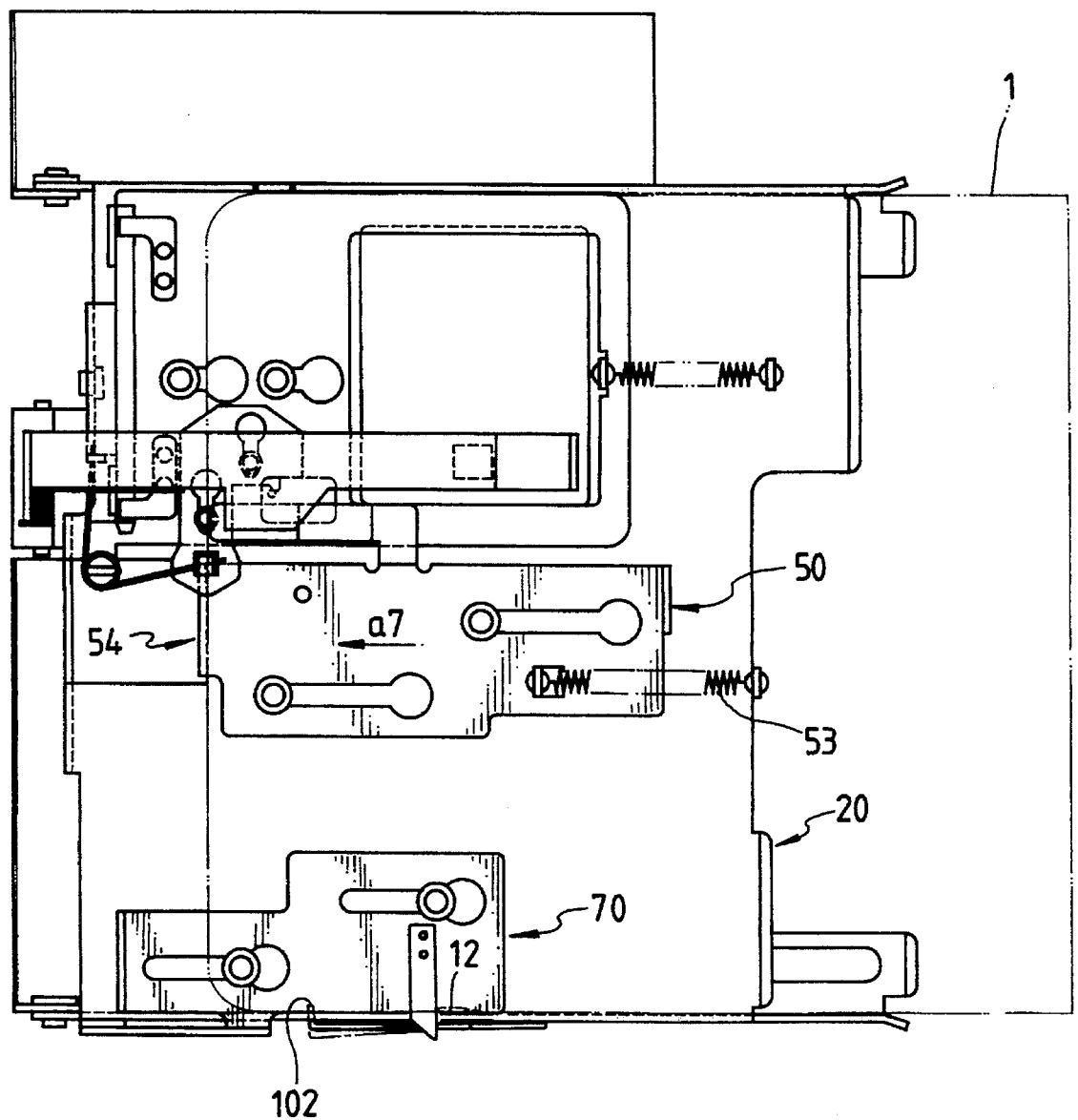
FIG. 12 is an extracted plan view illustrating an initial state where a recordable minidisk is inserted into the cartridge holder of the inserting/extracting apparatus for the magnetooptical disk player according to the preferred embodiments.
Figure 13:
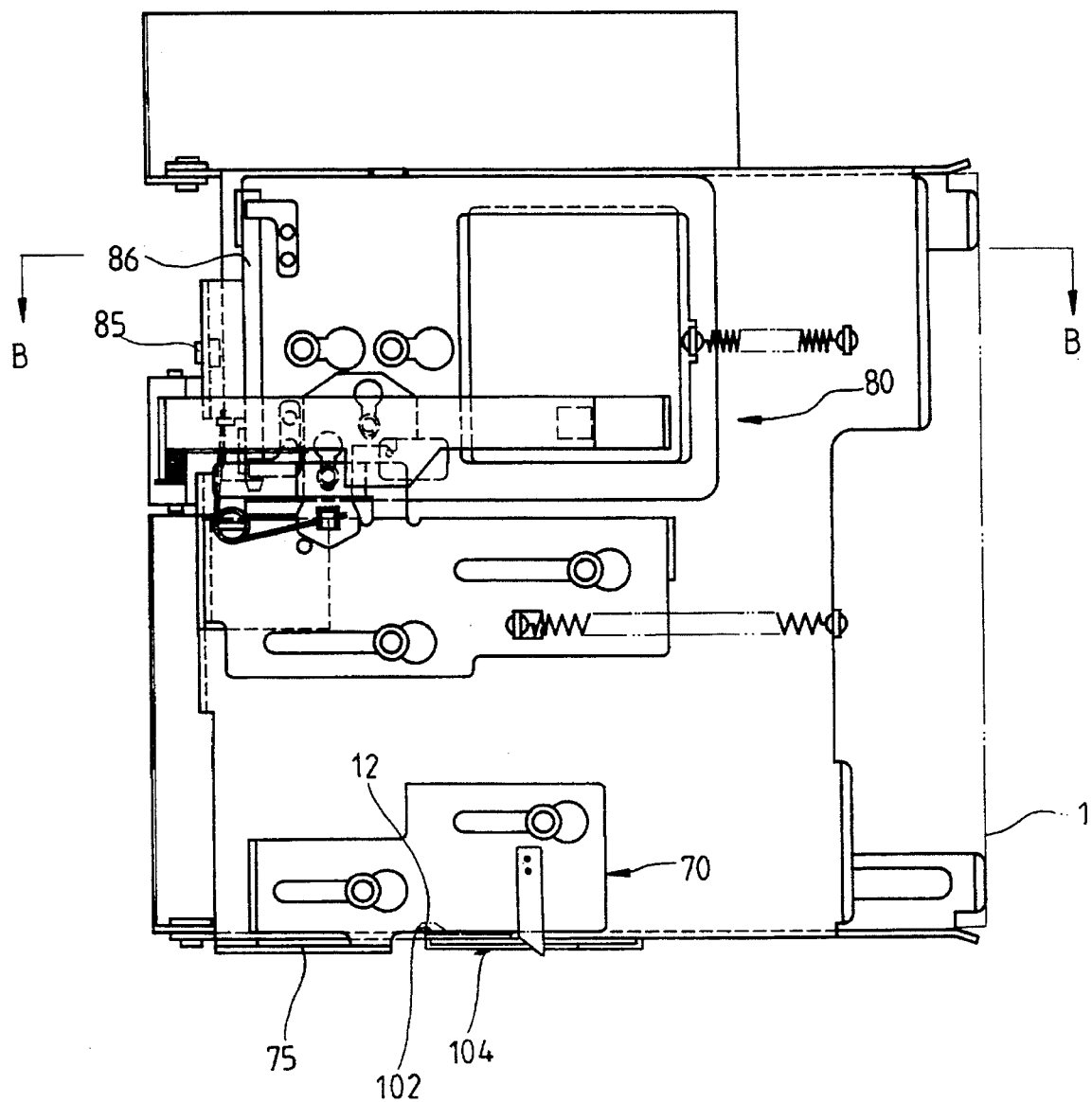
FIG. 13 is a plan view showing the recordable minidisk inserted into the cartridge holder of the inserting/extracting apparatus for the magnetooptical disk player according to the preferred embodiments.

Next, a description of the cartridge inserting/extracting apparatus for a magnetooptical disk player according to the first preferred embodiment of the present invention using the recordable minidisk 1 shall be given with reference to the attached drawings. Referring to FIGS. 5, 6 and 12, when the minidisk 1 is inserted into the cartridge holder 20 with the cartridge holder 20 being opened, the front of the minidisk 1 contacts the contacting portion 54 of the extracting member 50. In this state, if the minidisk 1 is further pushed in, spring 53 is extended while extracting member 50 is pushed in the direction of arrow a7 (FIG. 12). Referring to FIGS. 13 and 16, the protruding pin 85 installed in the bent portion 84 of the slide member 80 cannot enter the detection groove 8 of the minidisk 1 and contacts the front surface of the minidisk 1. If the user continually pushes the minidisk 1, then the slide member 80 is pushed backward and thus the supporting stick 86 for supporting the protrusion portion 45 protruding from head connecting portion 42 of connecting member 40 is also withdrawn. Thus, the magnetic head 30 descends and thereby contacts the magnetooptical disk 9 in the minidisk 1.

Otherwise, referring to the FIGS. 6, 12 and 13, if the state in which the magnetooptical disk cartridge 1 is not completely inserted (refer to FIG. 12) is changed into the state in which the magnetooptical disk cartridge 1 is completely inserted (refer to FIG. 13), then while locking lever member 100 moves clockwise about the locking lever supporting stick 107 by an operation of a locking lever spring 104, as suspending portion 102 enters the groove 12 of the minidisk 1. In this state, even though a user attempts to extract the minidisk 1 in order to exchange the minidisk for another one, the minidisk 1 could not be removed since the fixing groove 12 receives the suspending portion 102 as described above, and thus the magnetic head 9 contacting the upper surface of the disk 9 is protected (see FIG. 16).

Figure 14:
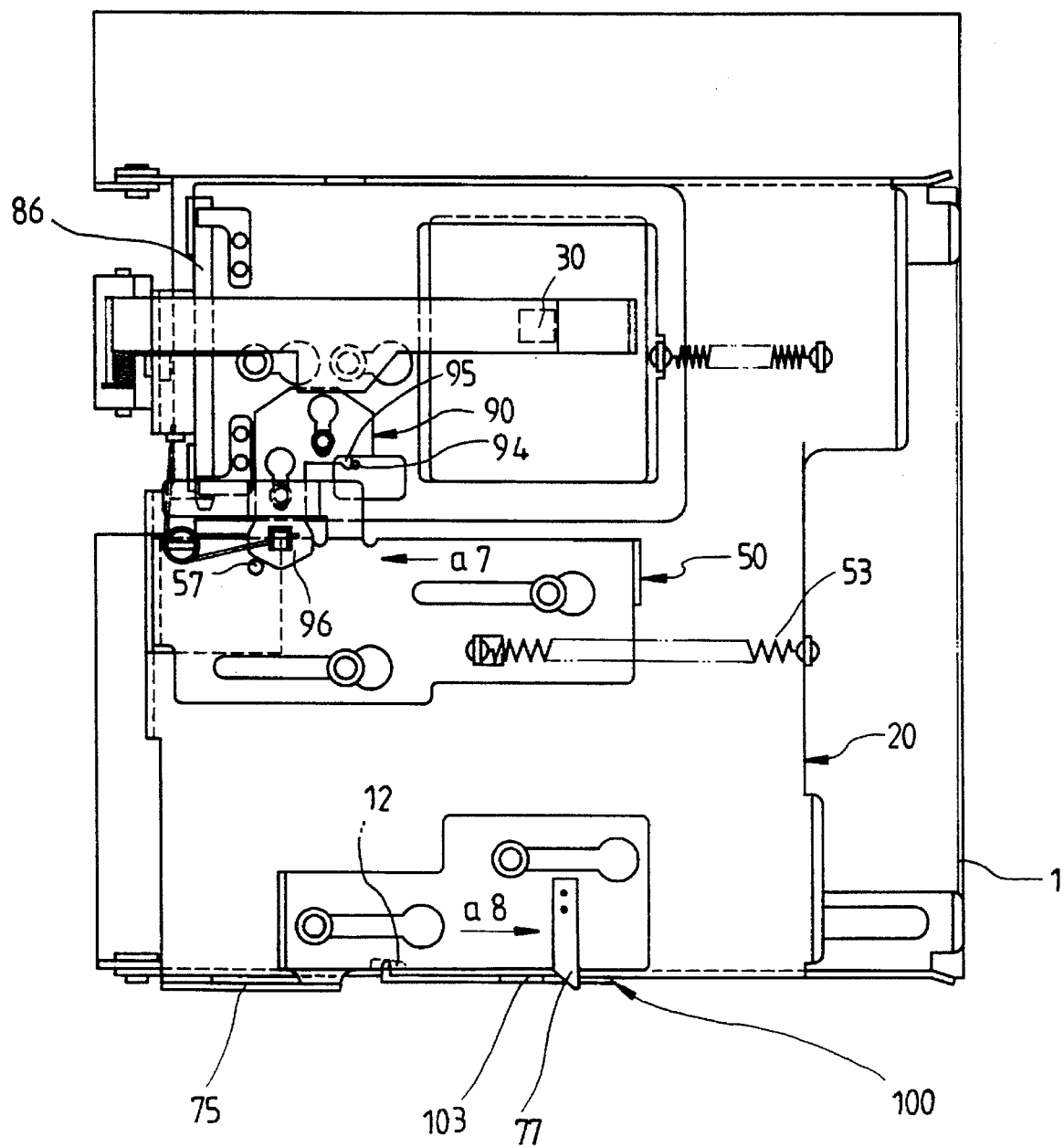
FIG. 14 is a plan view showing a recordable minidisk inserted into the cartridge holder of the inserting/extracting apparatus for the magnetooptical disk player according to the preferred embodiment, with the cartridge holder closed for recording and reproducing.

Referring to FIGS. 13, 14 and 16, if the user lowers the cartridge holder 20 in order to load the minidisk 1 on the upper surface 111 of the deck in the state in which the minidisk 1 is received in the cartridge holder 20, then the descending cartridge holder 20 moves the link 75 and the locking release plate spring 77 of the locking release member 70 in the a10 direction (FIGS. 6 and 10). At this time, a vertical surface 62 (FIG. 10) which is formed in the plate spring 77 slides while in contact with sloped surface 64 (FIG. 10) formed on the locking lever protrusion portion 103 of the locking lever member 100, and passes over the locking lever protrusion portion 103 to be in the state shown in FIG. 14. In this state, the cartridge inserting/extracting apparatus for a magnetooptical disk player of the present invention performs selectively a predetermined recording and/or reproducing function, and if the cartridge holder 20 is opened for exchanging with another minidisk 1, then link 75 pulls locking release member 70 in the opposite direction of the arrow a8 (the locking release direction). Thus, sloped surface 61 (FIG. 10) formed in locking release plate spring 77 of the locking release member 70 pushes perpendicular surface 63 (refer to FIG. 10) formed in locking lever protrusion portion 103 of the locking lever member 100 and the locking lever member 100 which is engaged in the fixing groove 12 of the minidisk 1 counter-clockwise, to move suspending portion 102 out of fixing groove 12 and thereby release the locked state.

As described above, if the locking state of the locking lever member 100 is released, the magnetooptical disk cartridge moves in the opposite direction of arrow a7 due to a restoring force of the extended spring 53 of the extracting member 50. At this time, the interlocking pin 57 of the extracting member 50 touches locking release portion 96 of slide locking member 90 while moving in the direction of extraction and thereby locking portion 95 of the slide locking member 90 breaks away from the locking pin 94 and the slide member 80 returns its original position. Accordingly, as shown in FIGS. 5 and 6, since supporting stick 86 returns to its original position and pushes the protrusion portion 45 of the head supporting member 32 so that the head 30 installed thereon ascends, damage to the magnetic head can be prevented when the minidisk 1 is extracted. Also, head supporting portion 56 is formed in the extracting member 50 to raise the head supporting member 32 in accordance with the movement of the supporting portion 56 in the extracting direction (the opposite direction of arrow a7). Accordingly, since the magnetic head 30 does not touch the extracted minidisk 1 as it is ejected, there is no damage to magnetic head 30.

Figure 17:
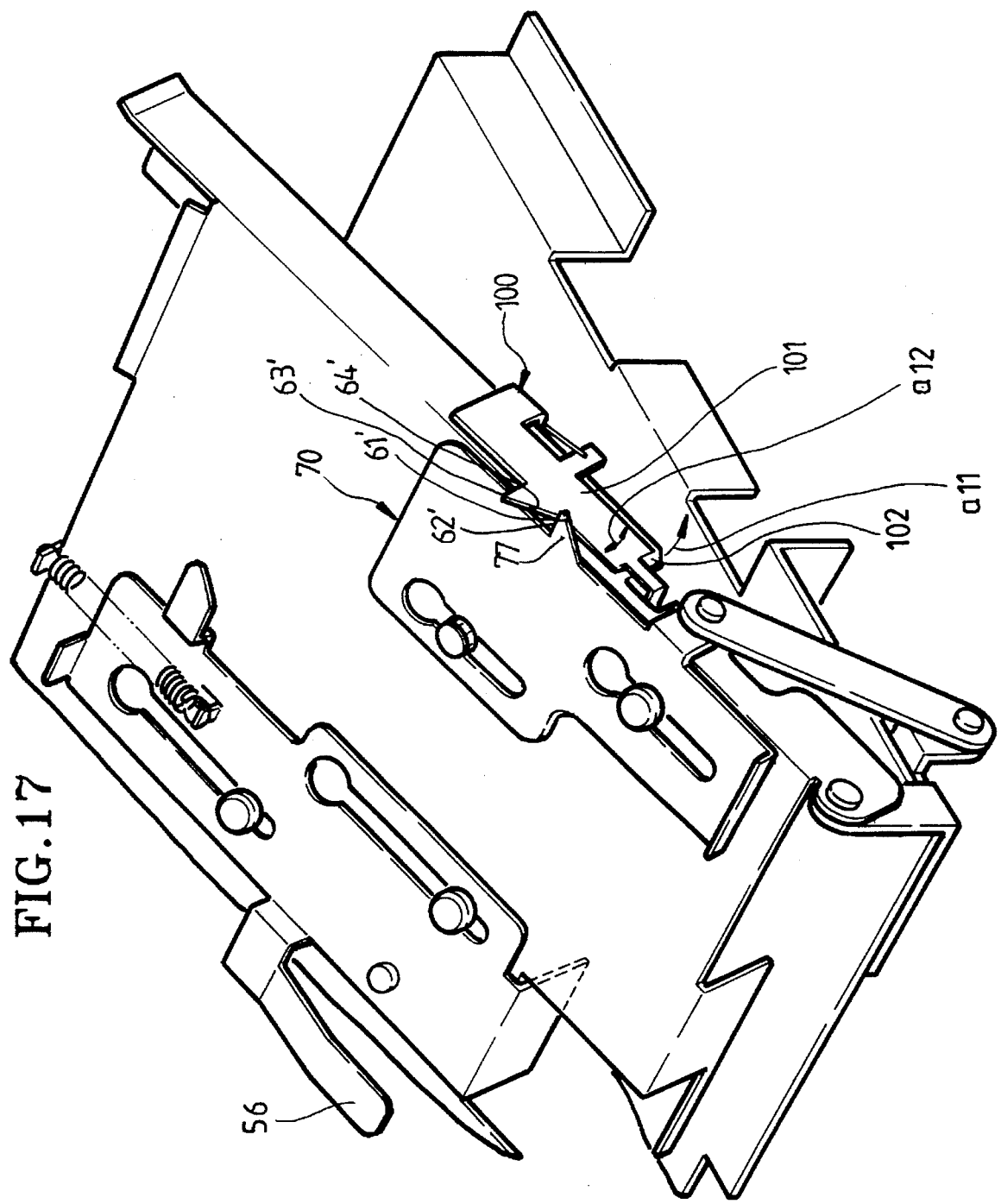
FIG. 17 is a perspective view of a main portion of a cartridge holder of an inserting/extracting apparatus for a magnetooptical disk player, according to a second preferred embodiment the present invention.

A second embodiment of the present invention is shown in FIGS. 17 and 18, the reference numbers thereof being the same as for like parts of the above embodiment. Hereafter the operation according due to a different configuration of the second embodiment shall be described. A locking lever protrusion 77' is formed in the locking release member 70. A spring 104, elastically biases a locking lever member 100 in the upward direction of arrow a12 and in the clockwise direction of arrow a11. Thus, when the cartridge holder 20 is lowered, a vertical surface 62' of the locking lever protrusion portion 77' pushes a sloped surface 64' of locking lever member 100 and lowers and then raises the locking lever member 100 and thereby protects the locking release. When the cartridge holder 20 is opened, the sloped surface 61' pushes the vertical surface 63' in the a11 direction, and a suspending portion 102 which is recieved in a suspend groove 12 rotates, so that it moves out of the suspend groove 12 and the locking state is released.

Figure 19:
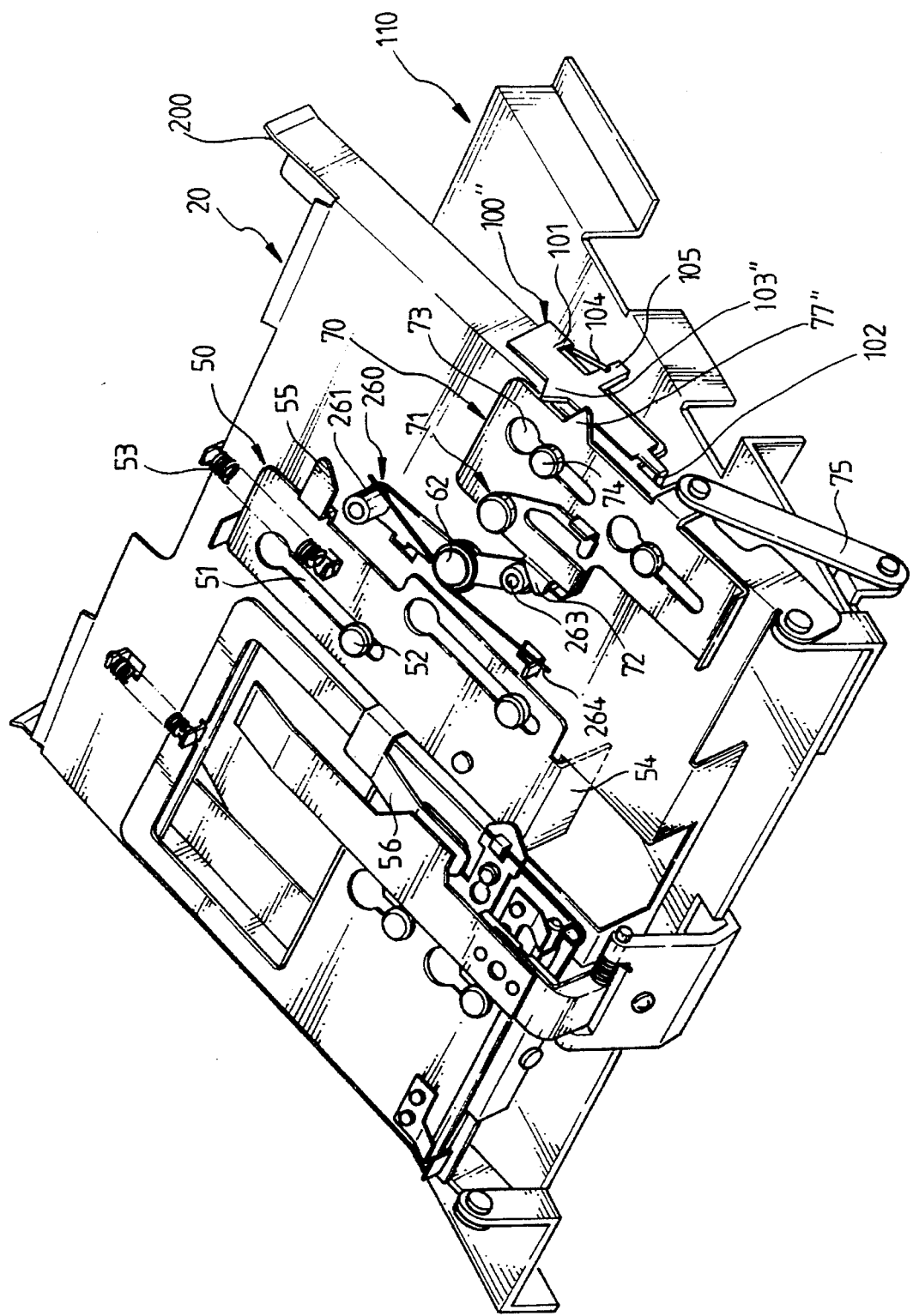
FIG. 19 is a perspective view of a cartridge inserting/extracting apparatus for a magnetooptical disk player, with the cartridge holder opened, according to a third preferred embodiment.
Figure 20:
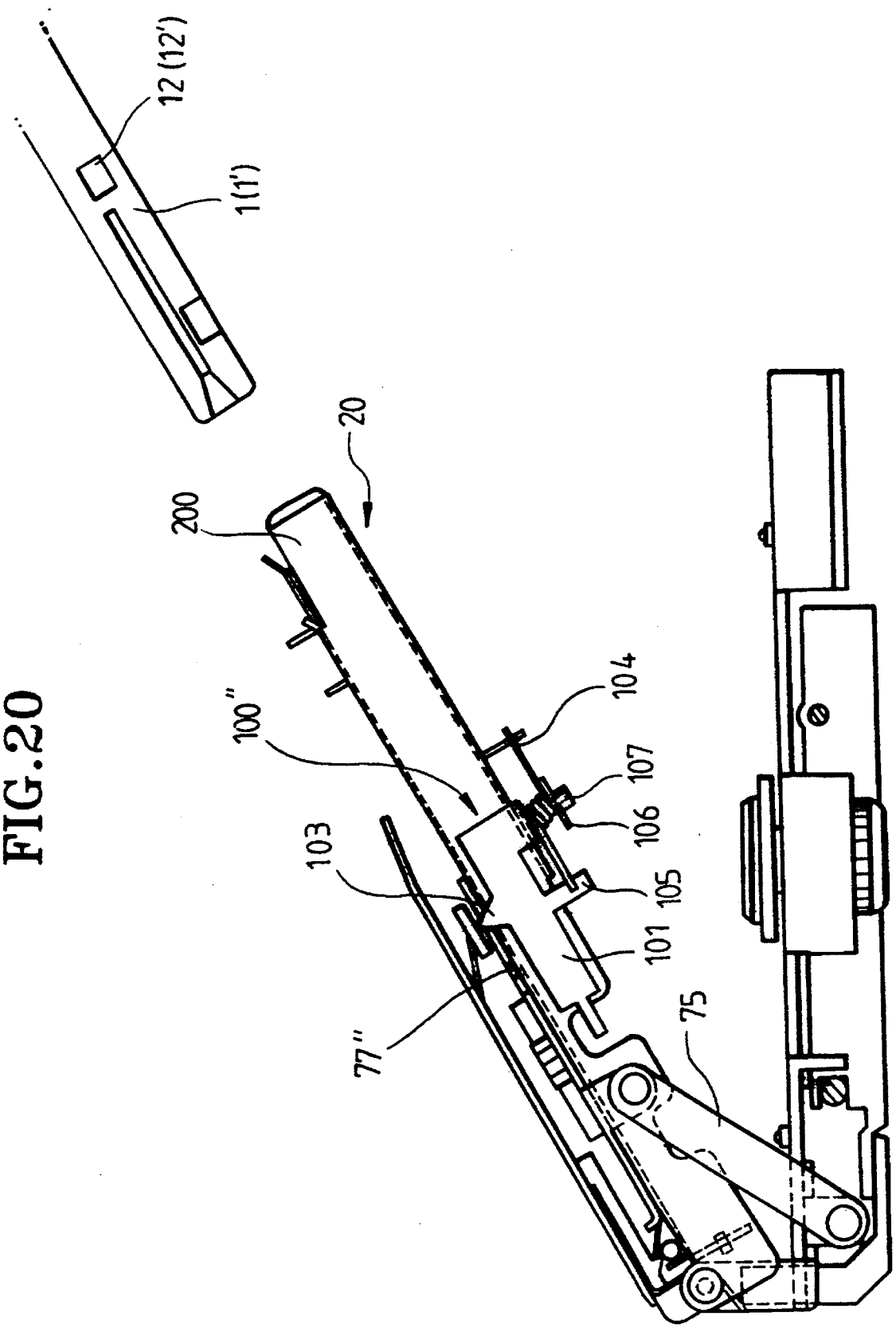
FIG. 20 is a side view of the cartridge inserting/extracting apparatus for the magnetooptical disk player, according to the third preferred embodiment present invention.
Figure 21:
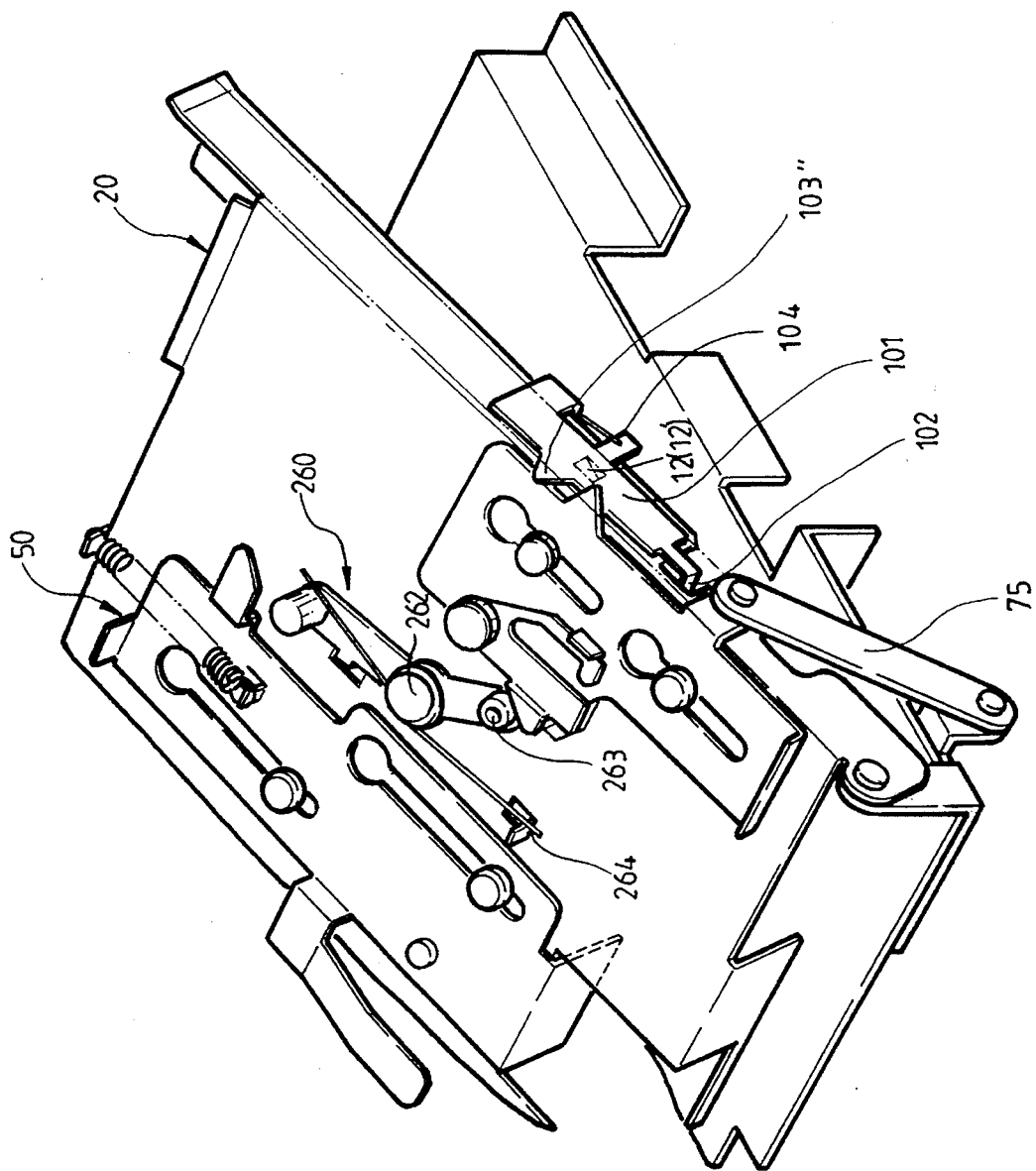
FIG. 21 is an extracted perspective view of a cartridge extractor and a locking lever member in the cartridge inserting/extracting apparatus for the magnetooptical disk player, according to the third preferred embodiment.

Hereafter, a third embodiment according to the present invention shall be described. The reference numbers not described in this embodiment are the same as those of the first embodiment, and the operation of the different configuration of this embodiment shall be described. In FIGS. 19, 20 and 21, the upper surface of the cartridge holder 20 has an extracting member 50 of the extracting means for pushing out an inserted minidisk forward, a locking member 260 and a locking release member 70, and a locking lever member 100" for preventing a user's extraction of the minidisk 1. The extracting member 50 is supported by slot 51 and supporting pin 52 to move back and forth and is elastically biased forward by spring 53. The extracting member 50 has a contact portion 54 to contact the front of an inserted minidisk, a locking protrusion 55 being hung on a locking pin 261 of a locking member 260, and head supporting member 56, extended from one side of extracting member 50 and capable of supporting head supporting member 32 of the magnetic head 30.

The locking member 260 is rotatably supported by a pivot 262 is elastically biased by a torsion spring 264 in a counter-clockwise direction, and has a releasing pin 263 which opposes pivot 262. This releasing pin 263 interlocks with a protrusion 72 of a spring member 71 which is pivotally supported by a locking release member 70, so that the locking pin 261 can retreat clockwise. The locking release member 70 is supported by slot 73 and supporting pin 74 to move back and forth and is connected with a deck 110 through a link 75. On the outer surface of the locking release member 70, a locking release protrusion 77" is provided for interlocking with a locking lever member 100" (described below). The locking release member 70 moves together with a spring member 71 back and forth over the cartridge holder 20 according to closing and/or opening of the cartridge 20. The locking lever member 100" comprises a locking lever 101 installed on the left side of the cartridge holder 20 and elastically biased clockwise by a locking lever spring 104, a locking lever spring supporting portion 105 for supporting a force of the locking lever spring 104, and a suspending portion 102 for engaging with the fixing grooves 12 and 12' of the minidisks 1 and 1'.

The locking lever 101 and the locking lever spring 104 are rotatably supported on a locking lever supporting stick 107 which is provided on a lower part of the cartridge holder 20, and a washer 106 is coupled to the lower portion of the locking lever supporting stick 107. A locking lever protrusion 103" which interlocks with a locking release protrusion 77" of the locking release member 70 is formed on the upper part of the locking lever 101.

Figure 22:
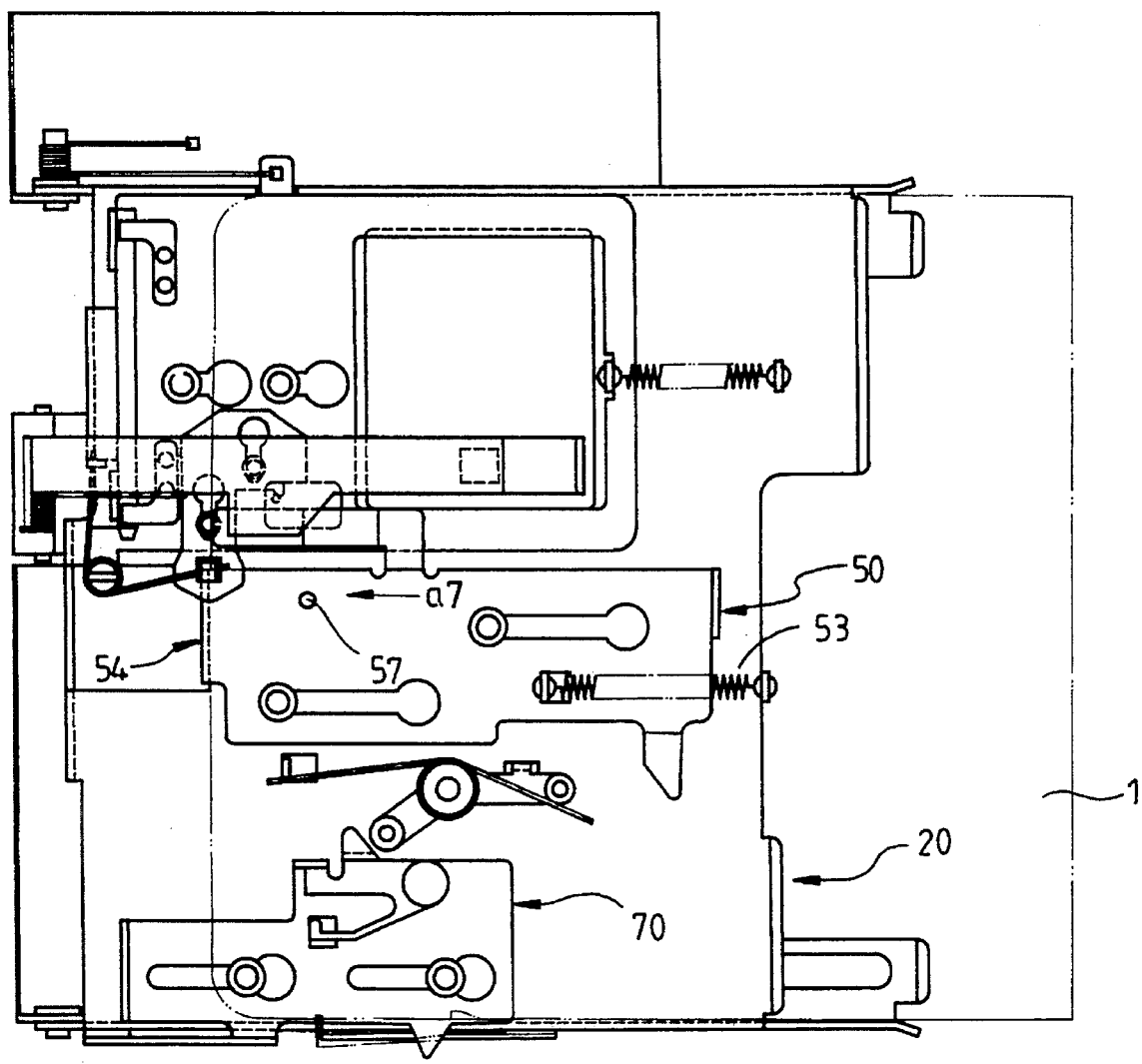
FIG. 22 is an extracted plan view showing an initial state in which a recordable minidisk is inserted into the cartridge holder of the cartridge inserting/extracting apparatus for the magnetooptical disk player, according to the third preferred embodiment.

Hereafter, a description of the cartridge inserting/extracting apparatus for the magnetooptical disk player of the third preferred embodiment described above shall be provided. As explained above with respect to the first embodiment, when after inserting the minidisk into the cartridge holder 20 a user removes the recordable minidisk to exchange it for another recordable minidisk without closing the cartridge holder 20, the magnetic head may become damaged. If the minidisk 1 is inserted, as shown in FIG. 19, into the cartridge holder 20 in the state where the cartridge is opened, then the front side of the inserted minidisk 1, as shown in FIG. 22, contacts the contact portion 54 of the extracting member 50. In this state, if the minidisk 1 is further pushed in, then the extracting member 50 is pushed in the a7 direction so that a spring 53 is extended, and a locking protrusion 55 of the extracting member 50 engages with a locking pin 261 of the locking member 260 to be locked in position. The locking protrusion 55 is formed such that its one side is slanted, and thereby easily passes by the locking pin 261 while pushing the locking pin 261 against the force of a spring 264, and the locking pin 261 returns instantly, and thus the locking operation is performed smoothly.

Figure 23:
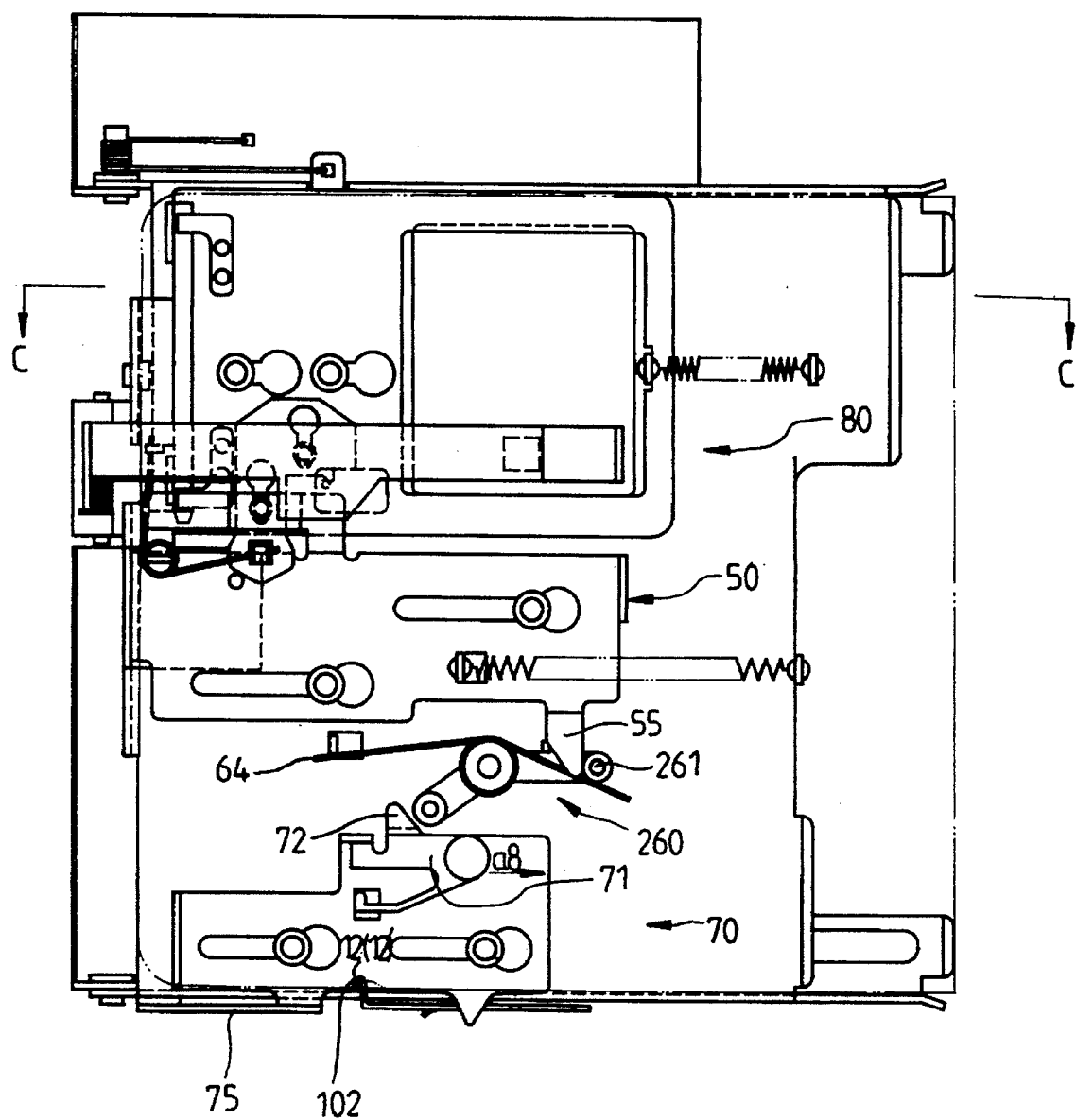
FIG. 23 is a plan view illustrating the recordable minidisk inserted into the cartridge holder of a cartridge inserting/extracting apparatus for the magnetooptical disk player, according to the third preferred embodiment.

A protruding pin 85, as shown in FIGS. 23 and 26, being installed on bent portion 84 of slide member 80 is too large to be received in the detection groove 8 of the minidisk 1 and thus contacts the front side of the minidisk 1. If the minidisk 1 is pushed further, then the slide member 80 is pressed backward and, as shown in FIG. 26, a supporting stick 86 for supporting the protrusion 45 protruding from the head connecting portion 42 of the connecting member 40 also retreats. Then, the magnetic head 30 descends and thereby contacts the magnetooptical disk 9 in the minidisk 1.

Figure 24:
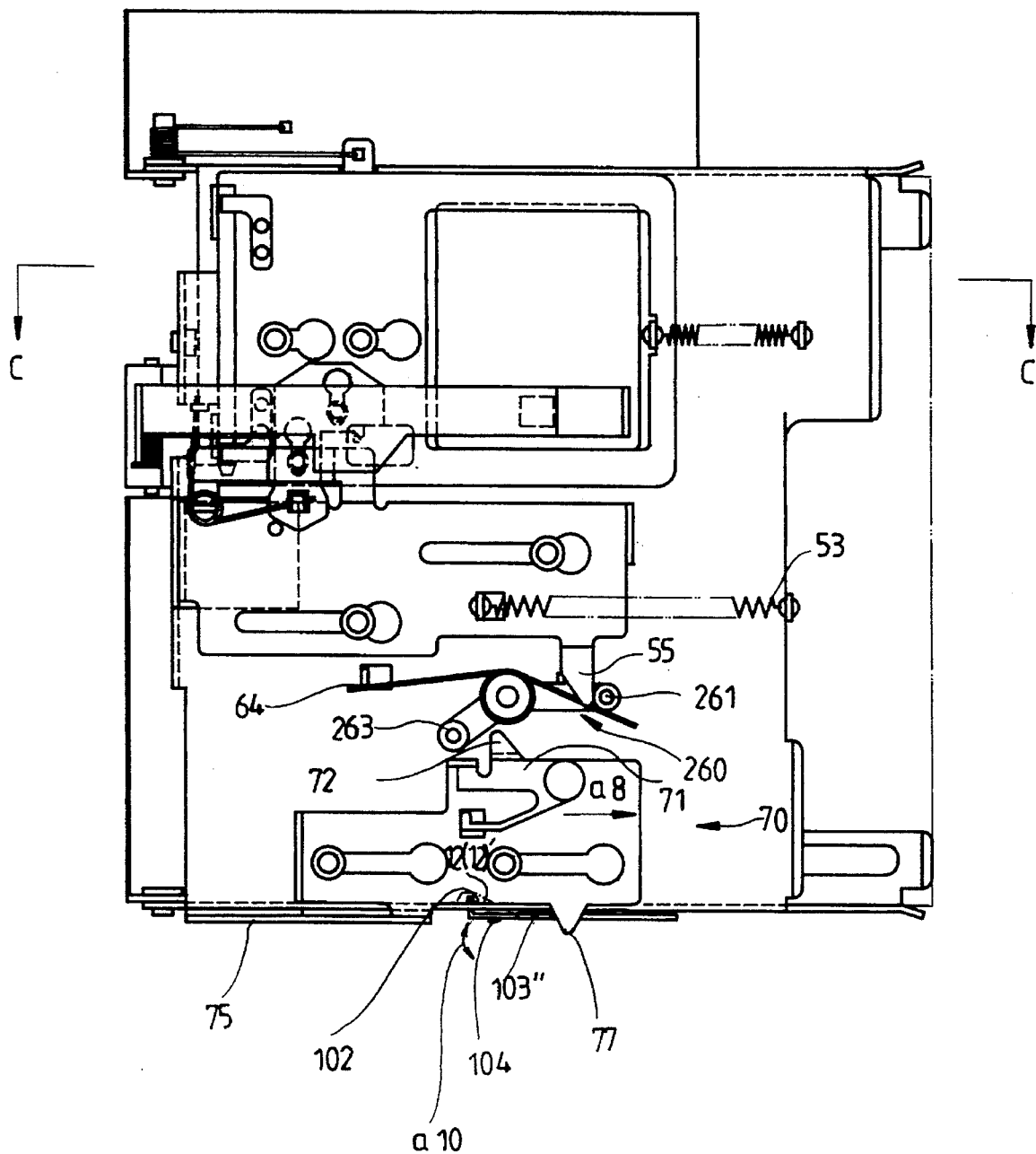
FIG. 24 is a plan view illustrating the recordable minidisk inserted into the cartridge holder of the inserting/extracting apparatus for the magnetooptical disk player, with the cartridge holder closed for recording and reproducing, according to the preferred third embodiment.
Figure 25:
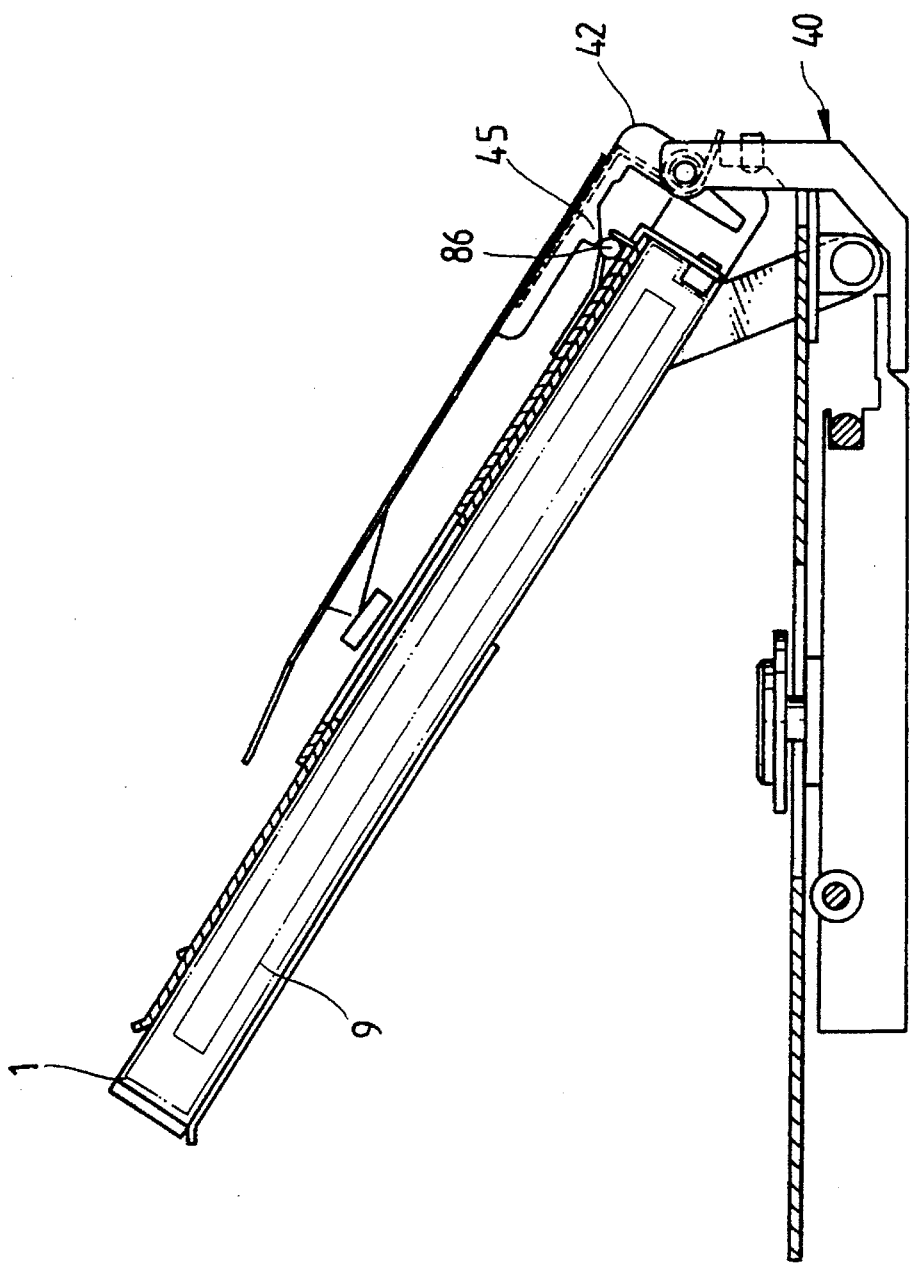
FIG. 25 is a sectional view cut along line C—C of FIG. 23, showing a reproduction-only minidisk inserted into the cartridge holder of the inserting/extracting apparatus for the magnetooptical disk player, according to the third preferred embodiment.

On the other hand, if the magnetooptical disk cartridge 1, as shown in FIGS. 23 and 26, is completely inserted, then, while a locking lever 101 rotates clockwise centering about the locking lever supporting stick by an operation of a locking lever spring 104, a suspending portion 102 is received in the fixing grooves 12 and 12' of the minidisk 1. In this state, even though a user attempts to withdraw minidisk 1 or 1', the minidisk cannot be taken out due to engagement between suspending portion 102 and fixing grooves 12 and 12', and thus the magnetic head 30 contacting the upper surface of disk 9 is protected. If a user, in this state, lowers the cartridge holder 20 to load the minidisk 1 which is completely received into the cartridge holder 20 on the upper surface of the deck 110, then by the interlocking between the lowered cartridge holder 20 and the link 75, the protrusion portion 72 of spring member 71 supported by a locking release member 70 moves in the a8 direction and thus, as shown in FIG. 24, is located in front of a releasing pin 63 of a locking member 60. Since the spring member 71 is weaker in elasticity than a torsion spring 64 which elastically biases a locking member 60 counter-clockwise, the locking state of the locking member 70 is not released.

If the locking release protrusion portion 77" hits a locking lever protrusion portion 103" while moving in the a8 direction, then a locking lever 101 rotationally moves in the a10 direction and returns by a locking lever spring immediately after the locking release protrusion portion 77" is passed. If a predetermined recording and/or reproducing function, in such a state as shown in FIG. 24, is selectively performed and the cartridge holder 20 is opened for exchanging minidisks, then the link 75 pulls the locking release member 70 in the direction opposite to arrow a8 (the locking release direction). Thus, the spring member 71 of the locking release member 70 pushes a releasing pin 263 of a locking member 260, and the locking member 260 rotates counter-clockwise, and a locking pin 261 breaks away from the locking protrusion 55 of the extracting member 50, and thus the locking state is released. The locking release protrusion 77" of the locking release member 70 pushes a locking lever protrusion 103" of a locking lever member 100", and makes the locking lever 101 which is received in the fixing groove 12 of the minidisk 1 rotate counter-clockwise, thereby releasing the locking state. Thus, if the locking states of the extracting member 50 and the locking lever member 100" are released, then the cartridge moves in the direction opposite arrow a7 shown in FIG. 19 by a restoring force of the spring 53 which is extended and is taken out while performing the extraction process of the first embodiment described above.

As described above, since the cartridge inserting/extracting apparatus for a magnetooptical disk player according to the present invention has a simple structure in which the minidisk is loaded and unloaded by insertion into a door-type cartridge holder, it is advantageous in reducing the volume of the player. Also, since little electrical power is consumed in the opening and closing of the cartridge holder, the power consumption of the apparatus can be reduced. Therefore, the present invention is very effective in the miniaturization of the auxiliary memory of a computer or similar apparatus as well as for use in a portable magnetooptical disk player.

The invention has been described through preferred embodiments. Various modifications will be apparent to those skilled in the art without departing from the scope of the invention as defined by the appended claims.

What is claimed is:

1. A cartridge inserting/extracting apparatus for a disk player, the disk player comprising a cartridge holder which receives a disk cartridge that has a fixing groove formed on one side thereof, said cartridge holder being rotated to load the disk cartridge onto a deck of the disk player, and extracting means being installed on the cartridge holder and being moved in a first direction as a disk is inserted into the cartridge holder, said extracting means being movable in a second direction to extract a disk from said cartridge holder, said apparatus comprising:

a locking releasing plate slidably installed on the cartridge holder;

a link coupling said lock releasing plate to the deck to cause the locking releasing plate to slide with respect to the cartridge holder in response to rotation of the cartridge holder;

a resilient plate spring disposed on said locking releasing plate, said plate spring having a first sloped surface and a first perpendicular surface formed thereon;

a locking lever rotatably installed on the cartridge holder and having a suspending portion formed thereon which is received in the fixing groove of the disk cartridge when the disk cartridge is inserted into the cartridge holder and the locking lever is in a locked position, and a locking lever protrusion formed on said locking lever, said locking lever protrusion having a second sloped surface and a second perpendicular surface; and an elastic biasing member for biasing the locking lever in a first rotational direction toward the locked position;

wherein said locking releasing plate is moved in a first linear direction as said cartridge holder is rotated to a loaded position so that said first perpendicular surface slides along said second sloped surface as said plate spring is bent away from said locking lever to thereby allow said locking lever to remain in the locked position and wherein said locking releasing plate is moved in a second linear direction as said cartridge holder is rotated to an unloaded position so that said first sloped surface slides along said second perpendicular surface to thereby rotate said locking lever away from the locked position to allow the extracting means to extract the disk cartridge from the cartridge holder.

2. An apparatus as recited in claim 1, wherein said locking releasing plate is installed on an upper surface of said cartridge holder and wherein said locking lever is rotatable about a supporting stick that extends from a lower surface of said cartridge holder, a rotational axis of said locking lever being perpendicular to said first linear direction and said second linear direction.

3. An apparatus as recited in claim 1, wherein said disk cartridge houses a magnetooptic disk therein.

4. An apparatus as recited in claim 1, wherein said locking release plate moves in concert with said extracting means.

* * * * *